(12) United States Patent
Gridley

(10) Patent No.: US 10,774,563 B2
(45) Date of Patent: Sep. 15, 2020

(54) SWIVEL SUPPORT STRUCTURE

(71) Applicant: William E. Gridley, Dousman, WI (US)

(72) Inventor: William E. Gridley, Dousman, WI (US)

( * ) Notice: Subject to any disclaimer, the term of this patent is extended or adjusted under 35 U.S.C. 154(b) by 2055 days.

(21) Appl. No.: 13/949,527

(22) Filed: Jul. 24, 2013

(65) Prior Publication Data

US 2014/0020799 A1 Jan. 23, 2014
US 2018/0257470 A9 Sep. 13, 2018

Related U.S. Application Data

(60) Continuation-in-part of application No. 29/455,317, filed on May 20, 2013, now Pat. No. Des. 719,431, (Continued)

(51) Int. Cl.
*E04H 15/26* (2006.01)
*B60J 11/04* (2006.01)
*F24F 7/02* (2006.01)
*F16C 11/06* (2006.01)
(Continued)

(52) U.S. Cl.
CPC .............. *E04H 15/26* (2013.01); *B60J 11/04* (2013.01); *B63B 17/02* (2013.01); *F16C 11/069* (2013.01);
(Continued)

(58) Field of Classification Search
CPC ......... E04H 15/28; E04H 15/60; E04H 15/26; E04H 12/22; E04H 12/2238; E04H 12/2269; F16C 11/06; F16C 11/106; F16C 11/069; F16C 11/0623; F16C 11/0604; F16C 11/0695; F16C 2326/30; F16C 2350/00; Y10T 403/32631; Y10T 403/32204; Y10T 403/32606; Y10T 403/597; B60J 11/00; B60J 11/04; B63B 17/02
USPC ........................ 135/16, 96, 98, 99, 114, 116; 248/188.1–188.2, 519, 523, 529, 248/181.1–181.2; 403/127, 122, 289, 403/322.2, 323
See application file for complete search history.

(56) References Cited

U.S. PATENT DOCUMENTS 2,219,169 A * 10/1940 Alter ....................... B60R 11/04
248/200.1
5,278,735 A * 1/1994 Her ......................... B60Q 7/02
362/397

(Continued)

*Primary Examiner* — Winnie Yip
(74) *Attorney, Agent, or Firm* — Monty Simmons; Simmons Patents

(57) ABSTRACT

Disclosed are the design and utilitarian characteristics of a support device for supporting a cover wherein such cover is typically used to cover a vehicle such as a boat or automobile. The invention includes a dome shaped support device with a depending base configured for extending through a cover. The depending base defines an interface for being associated with a support structure such as a pole and such interface may be a swivel interface. Additionally, the support device may define a suspension interface so that a tether may be used to apply a support force from above the support device. The support device may also define a swivel device configured for being associated with a support surface such as a floor.

9 Claims, 39 Drawing Sheets

Related U.S. Application Data and a continuation-in-part of application No. 29/416,183, filed on Mar. 20, 2012, now Pat. No. Des. 712,730, which is a continuation-in-part of application No. 13/090,444, filed on Apr. 20, 2011, now Pat. No. 8,220,474, and a continuation-in-part of application No. 12/464,045, filed on May 11, 2009, now Pat. No. 8,196,877, said application No. 13/090,444 is a division of application No. 12/400,952, filed on Mar. 10, 2009, now Pat. No. 8,069,870.

(60) Provisional application No. 61/035,345, filed on Mar. 10, 2008, provisional application No. 61/059,757, filed on Jun. 7, 2008, provisional application No. 61/052,415, filed on May 12, 2008.

(51) Int. Cl.
*B63B 17/02* (2006.01)
*E04H 15/16* (2006.01)

(52) U.S. Cl.
CPC .............. *F24F 7/02* (2013.01); *E04H 15/16* (2013.01); *F16C 11/0604* (2013.01); *F16C 11/0623* (2013.01); *F16C 2326/20* (2013.01); *F16C 2326/30* (2013.01); *F16C 2350/00* (2013.01); *Y10T 403/32204* (2015.01); *Y10T 403/32606* (2015.01); *Y10T 403/32631* (2015.01)

(56) References Cited

U.S. PATENT DOCUMENTS

| | | | | |
|---|---|---|---|---|
| 5,280,892 | A * | 1/1994 | Smith | B23Q 1/0027 269/45 |
| 5,538,364 | A * | 7/1996 | Huntsman | E21D 15/54 405/288 |
| 6,742,750 | B2 * | 6/2004 | Burr | A47B 91/066 248/188.2 |
| 7,344,320 | B2 * | 3/2008 | Barker | F16M 11/14 135/66 |
| 7,452,154 | B2 * | 11/2008 | Aoshima | F16B 21/082 362/514 |
| 7,810,771 | B1 * | 10/2010 | Akers | E04G 21/24 160/368.1 |
| 8,205,760 | B2 * | 6/2012 | Chang | A47H 1/102 211/105.3 |
| 2008/0087783 | A1 * | 4/2008 | Istas | F16M 11/14 248/288.11 |
| 2009/0314910 | A1 * | 12/2009 | Jeanveau | A45B 11/00 248/231.71 |
| 2013/0175422 | A1 * | 7/2013 | Clarke | E04H 12/2269 248/523 |
| 2016/0083048 | A1 * | 3/2016 | Munsch | B63B 17/02 248/539 |
| 2016/0123522 | A1 * | 5/2016 | Hahn | A63B 71/023 248/523 |

\* cited by examiner

Right Side

Left Side

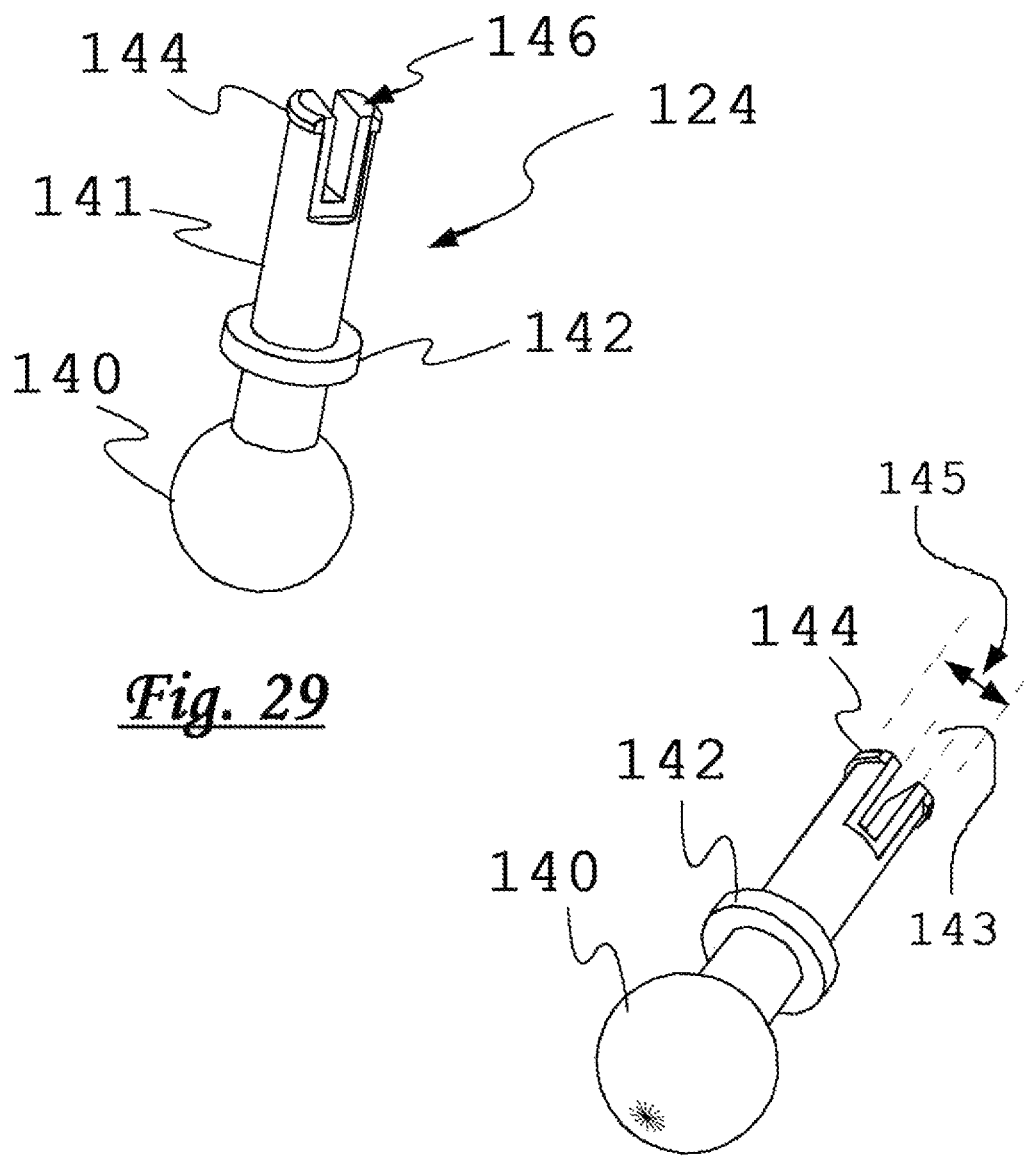

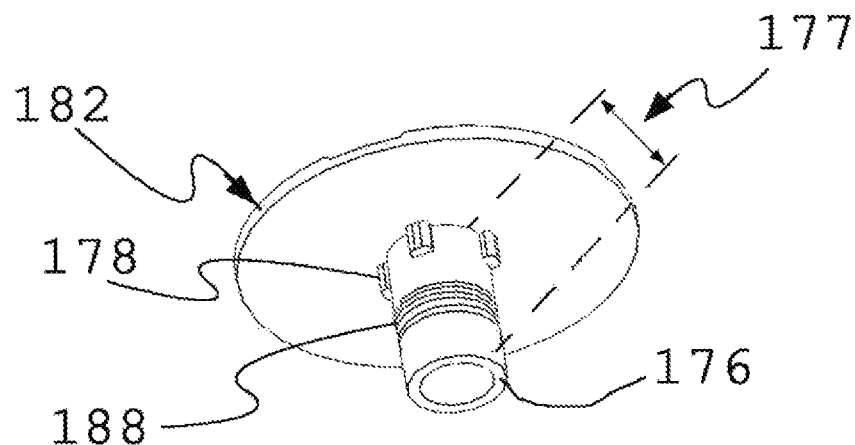
Fig. 42
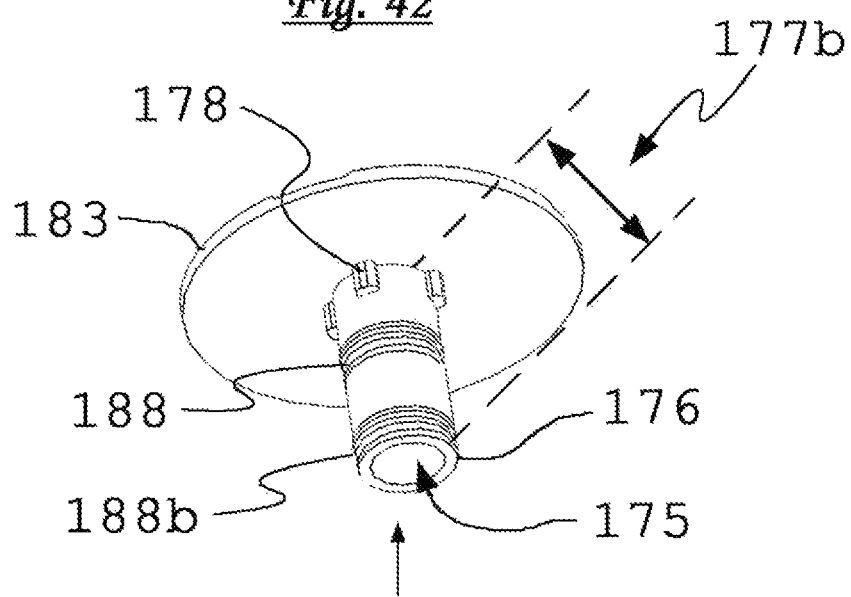
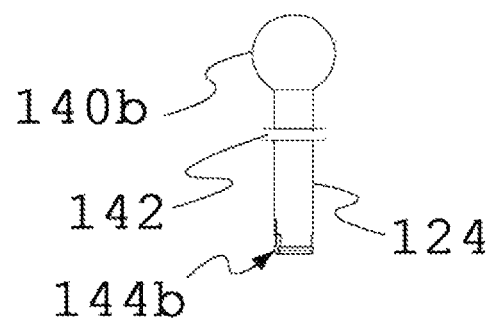
Fig. 43

SWIVEL SUPPORT STRUCTURE

CLAIM TO PRIORITY

This application is: (1) a continuation in part to application Ser. No. 29/416,183, filed on Mar. 20, 2012, which is a continuation in part to patent application Ser. No. 29/385, 453, filed Feb. 14, 2011; (2) a continuation in part to U.S. Pat. No. 8,069,870 which claims priority to application 61/059,757, filed on Jun. 7, 2008, and application 61/035, 345 filed on Mar. 10, 2008; (3) a continuation in part to Ser. No. 29/385,453, which is a continuation of Ser. No. 12/400, 952, filed on Mar. 10, 2009, and claiming priority to application 61/052,415, filed on May 12, 2008; (4) a continuation in part to PCT/US09/36711 filed on Mar. 10, 2009; (5) a continuation in part of U.S. Pat. No. 8,069,870; and (6) a continuation in part of U.S. Pat. No. 8,220,474 of which the entire contents of all such references are incorporated herein by this reference for all that they disclose for all purposes.

FIELD OF THE INVENTION

Embodiments of the present invention relate in general to the design and utilitarian features in the field of ventilator apparatuses and associated support structure and in particular to a ventilator apparatus, and associated support structure, adapted for use with a vehicle cover for items such as boats, automobiles, and any other objects.

BACKGROUND OF THE INVENTION

Recreational vehicles such as boats and travel trailers are typically stored outdoors when not in use. Often, a cover is placed over the entire vehicle to protect it from elements of the weather such as rain, snow, sleet, ultraviolet rays, heat from direct sunlight, as well as dirt and dust from the outside air. In this regard, a simple cover is quite effective and yet an inexpensive alternative to indoor storage. In the prior art, the covers can comprise canvas, plastic, and other generally non-porous materials. Obviously, a non-porous cover functions very well for its intended purpose. Neither dirt nor rain can penetrate the non-porous material, and as a result, the recreational vehicle is relatively well protected when not in use.

One problem with using a porous or non-porous cover to protect a vehicle is moisture and mildew resulting from condensation and other sources of moisture. In an entirely non-porous cover, the condensation, in the form of moisture, is trapped inside the cover where it can penetrate every unsealed surface of the covered vehicle and every electrical, mechanical, and fabric component in the vehicle. The trapped moisture is more damaging than the vehicle being left uncovered. An uncovered vehicle can dry out, but a covered vehicle with moisture trapped therewithin does not dry out, and the vehicle is continuously exposed to the moisture, which over a shortened period of time can cause a significant amount of damage.

The newer, breathable prior art materials allow some of the trapped moisture to escape, but not completely. Even with the breathable materials, moisture remains trapped inside the cover for a longer period of time than it would if the cover were removed and the vehicle allowed to air dry. It is to be noted that the moisture problem is not necessarily exclusive to the outdoors. Indeed, indoor storage, for example, where the air is not conditioned or otherwise dry, can experience high humidity. In such an environment, the moist air can damage a covered object or vehicle by becoming trapped under the cover.

In a commonly owned U.S. patent issued to Gridley (U.S. Pat. No. 6,938,631) on Sep. 6, 2005, the applicant disclosed a new apparatus for venting a cover covering a vehicle. Such a ventilation apparatus is configured so that air can freely pass in and out of the space inside of the cover. Applicant disclosed an improved ventilation and support device in U.S. Pat. Nos. 8,069,870 and 8,220,474 issued to Gridley on Dec. 6, 2011, and Jul. 17, 2012 respectively. U.S. Pat. Nos. 6,938,631, 8,069,870, and 8,220,474 are hereby incorporated by this reference for all that they disclose for all purposes.

While the applicant's prior art ventilation apparatus works well for its intended purposes, novel improvements to the apparatus have been developed and are disclosed herein.

One improvement relates to the shape of the ventilation apparatus to improve the fitment of the ventilator with a cover. Yet another improvement relates to providing a suspension interface to assist in storage in an unused cover as well as providing support while the ventilation apparatus is associated with a cover being used to cover a vehicle. A still further improvement relates to a ventilator support structure improvements including a swivel interface. Additional features are provided by combining the various new improvements.

SUMMARY OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide an improved support apparatus comprising curved ventilator plates that better associate with a cover.

Another principle object of the invention is to provide an improved ventilating support apparatus configured with a suspension interface. Such suspension interface can be used when storing a cover that is not in use (by suspending it from an elevated surface) or suspending the improved ventilator while associated with a cover being used to protect a vehicle such as a boat. For such configuration, a support pole is not necessary.

Another general object of the present invention is to provide an improved ventilator support system comprising a swivel interface that can be securely associated with a support surface.

For one configuration, the inventive cover ventilation/support device comprises a component assembly including a dome member defining a depending base, a first dome-shaped ventilator plate, a second dome-shaped ventilator plate and a nut. Such a ventilation device is configured so that the first ventilator plate is inserted into a hole defined by a cover (i.e., cover-hole) to be supported/vented. A second ventilator plate is associated with the first ventilator plate so that part of the cover surrounding cover-hole is between a portion of the first and second ventilator plates. The depending base extends through a hole defined at the center of each ventilator plate so that the free end of the depending base sticks out and is associated with a nut. The nut is tightened, which causes the first and second ventilator plates to move together, thereby clamping a portion of the cover between the ventilator plates. The depending base is further configured to receive a support structure component such as a pole.

Such a support structure component is associated with the depending base at one end and extends to a second end associated with a support surface (such as the floor of a boat).

For yet another embodiment, the improved ventilator plate comprises a component assembly including a dome member defining a suspension interface configured to receive a suspension device such as a rope connected to an elevated surface.

For still another embodiment, the improved ventilator plate comprises a component assembly including a dome member defining a depending base wherein said depending base defines a support structure interface at one end and a suspension interface at the other end. The support structure interface may also define a swivel interface.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps or features hereof may be practiced in various uses and embodiments of this invention without departing from the spirit and scope thereof, by virtue of the present reference thereto. Such variations may include, but are not limited to, the substitution of equivalent steps, referenced or discussed, and the functional, operational, or positional reversal of various features, steps, parts, or the like. Still further, it is to be understood that different embodiments, as well as different presently preferred embodiments, of this invention, may include various combinations or configurations of presently disclosed features or elements, or their equivalents (including combinations of features or parts or configurations thereof not expressly shown in the figures or stated in the detailed description).

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 29 is a side perspective view of one exemplary embodiment of a swivel element;

FIG. 30 is a side perspective view of one exemplary embodiment of a swivel element;

FIG. 42 is a bottom perspective of a support device dome comprising one exemplary depending base defining an attachment interface (188);

FIG. 43 is an exploded view of a dome/swivel interface system showing a bottom perspective view of the support device dome comprising one exemplary depending base defining a first attachment interface (188) and a second attachment interface (188*b*) and further comprising a swivel-interface at the free end of the depending base;

Figure 1:
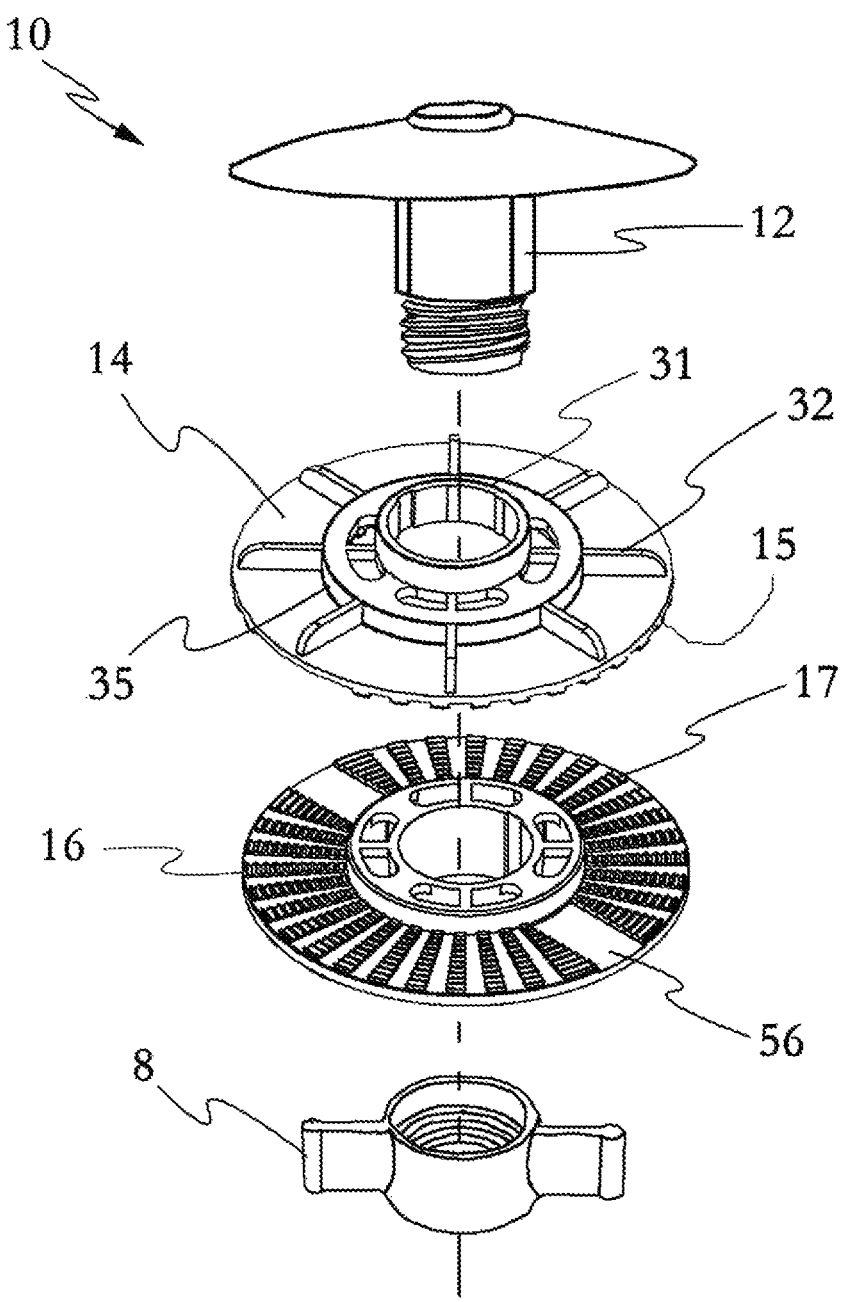
FIG. 1 is an exploded view of one exemplary embodiment of the invention showing a dome, a first ventilator plate and a second ventilator plate, and a nut.

Repeat use of reference characters throughout the present specification and appended drawings is intended to represent the same or analogous features or elements of the present technology. Various objects, advantages, and features of the invention will become apparent to those skilled in the art from the following discussion taken in conjunction with the drawings.

DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements, or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into a relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into a relationship with each other in any number of ways, including (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections, and/or cables as required by the embodiment of interest.

Referring now to FIG. 1, an exploded view of one exemplary embodiment of the invention is presented. The ventilator (10) comprises a dome (12), a first ventilator plate (14), a second ventilator plate (16), and a nut (8). For the illustrated embodiments depicted in the figures, a ventilator (10) can be generally envisioned to include an outer portion and an inner portion. The outer portion is generally that portion of the ventilator (10) that is located on the top or exterior side ("outside") of a cover (11) (see FIG. 2) and includes the top portion of the dome (12) and a first ventilator plate (14). The inner portion is generally that portion of the ventilator (10) that is located on the under-side or interior side ("inside") of the cover (11) (see FIG. 2) and includes part of the shaft portion of the dome (12), a second ventilator plate (16), and the securing nut (8). Thus, the dome (12) is common to the outer and inner portions of the ventilator (10).

Figure 1B:
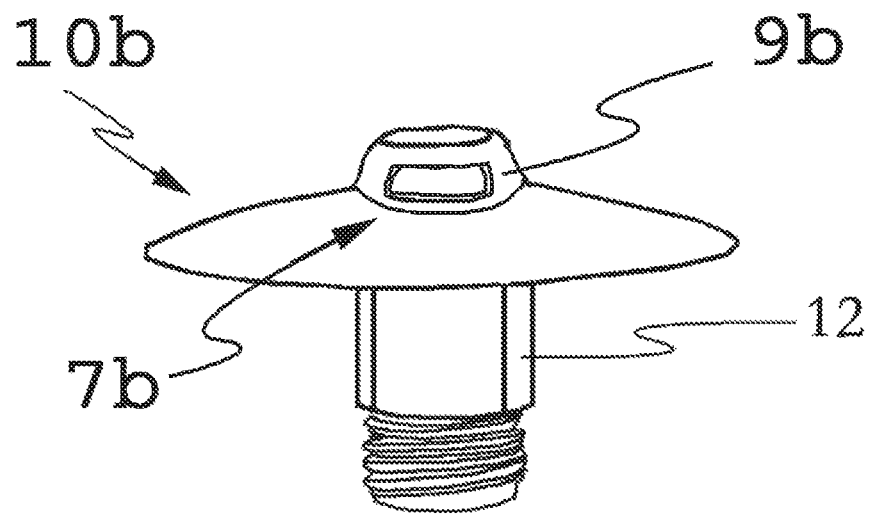
FIG. 1b is a side elevated view of one alternative embodiment of the invention comprising a suspension interface (9b)
Figure 1C:
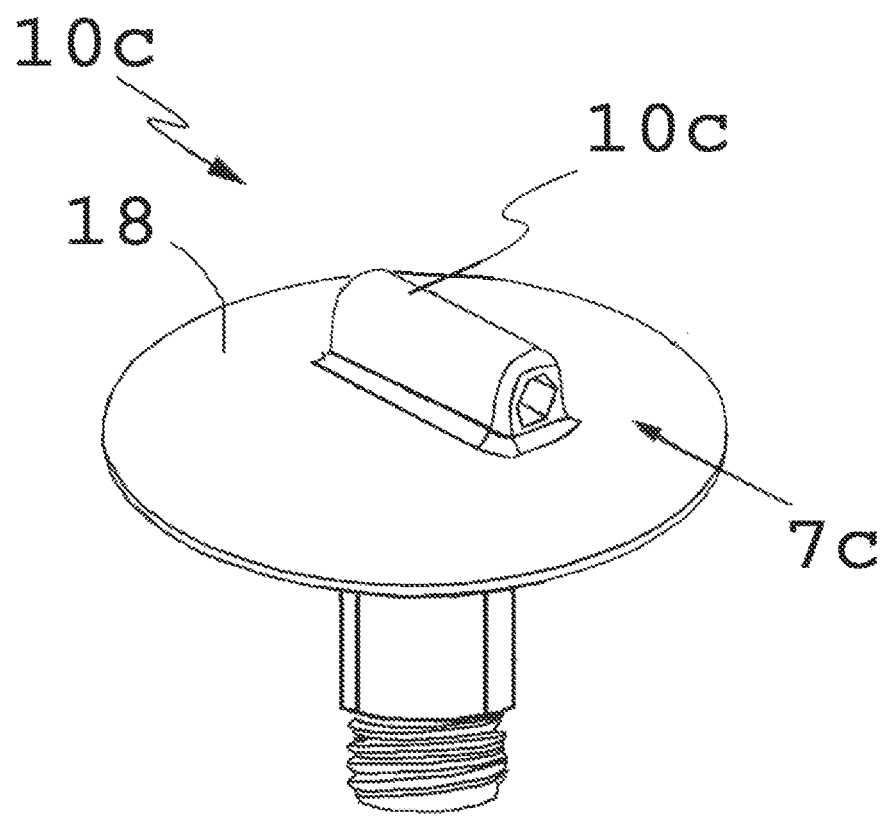
FIG. 1c is a side elevated view of another alternative embodiment of the invention comprising a suspension interface (7c)

FIG. 1*b* depicts one alternative embodiment of a ventilator (10), labeled ventilator (10*b*), which defines a suspension interface (9*b*), further defining an interface void (7*b*). Similarly, FIG. 1c depicts another alternative embodiment of a ventilator (10), labeled ventilator (10c), which defines a suspension interface (10c), further defining an interface void (7c). As depicted in FIG. 3c, and FIG. 3d, the suspension interface (9b, 10c) may be used to provide a support function from an elevated surface using a tether (4). For this configuration, a tether (4) or fastener is associated with suspension interface void (7b, 7c) and then secured to an elevated support structure. Such a suspension interface can also be used to stow a cover in an elevated position.

Figure 2:
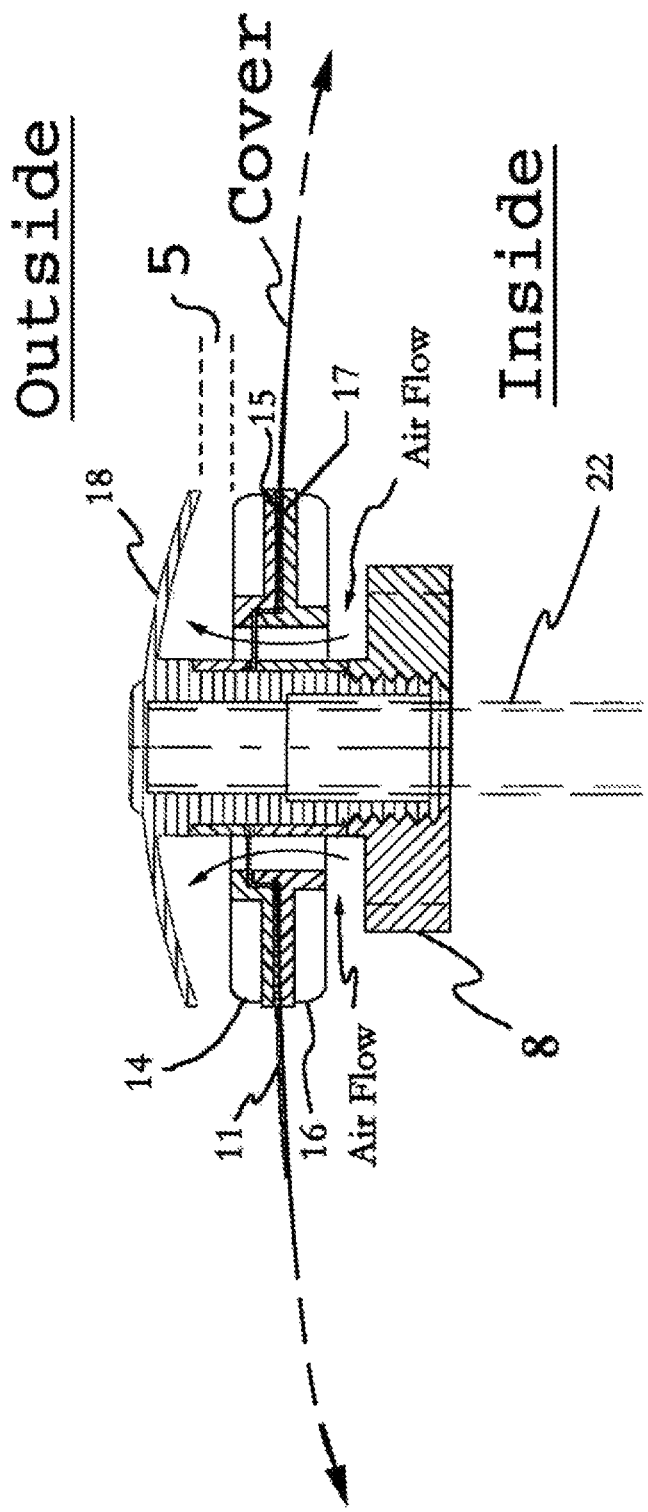
FIG. 2 is a front elevational view, in cross-section, of one embodiment of the present invention as it may appear in practice attached to a cover.

Referring now to FIG. 2, in the assembled view shown in FIG. 2, the cover material (11) is seen to include a hole therethrough with a main portion of the cover material (11) extending radially away from such hole and clamped between the opposed surfaces (15) and (17), of the first ventilator plate (14) and the second ventilator plate (16), respectively.

Figure 3:
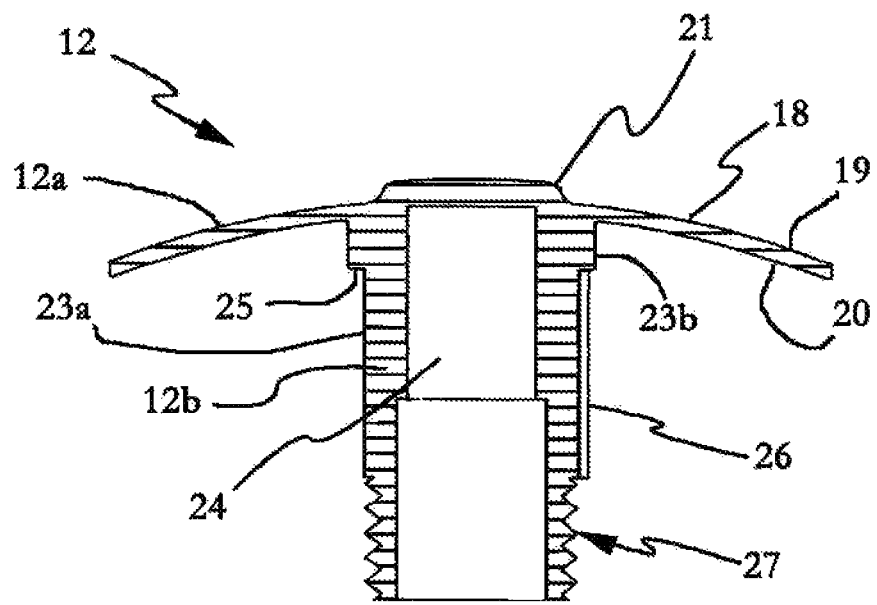
FIG. 3 is a front elevational cross-sectional view for one exemplary embodiment of the dome depicted in FIG. 1.

Referring now to FIG. 3, more details of the dome (12) are considered. Dome (12) generally comprises a dome portion (12a) and a shaft portion (12b). Dome portion (12a) comprises a circular plate (18) having a curved umbrella-like configuration such that the axial center point (21) is the uppermost portion and the outer surface curves in a downward direction as it extends away from the axial center. By way of further explanation, the upper surface (19) of the circular plate (18) has a convex configuration while the under the surface (20) has a concave configuration.

The dome portion (12a) serves in general to prevent rain and other elements from entering the cover through the air vents defined by the ventilator plates described later. One of ordinary skill in the art will appreciate that the domed configuration aids in such function by placing the outer edges of the dome on a plane substantially level, or slightly lower or higher than the air vents. Consequently, the outer diameter of the circular plate (18) of the dome portion (12a) may be, but not necessarily, equal to the outer diameter of the ventilator plates (14) and (16). Accordingly, the shape of the dome portion (12a) and its outer diameter is to be consistent with its intended function and is well within the knowledge of a person of ordinary skill in this art. In addition, embodiments of the invention where a circular plate (18) is replaced by other configurations (such as polygonal configurations) fall within the scope of the present invention. A square dome, for example, would reduce the tendency for the ventilator to roll when set on a table top.

Figure 3B:
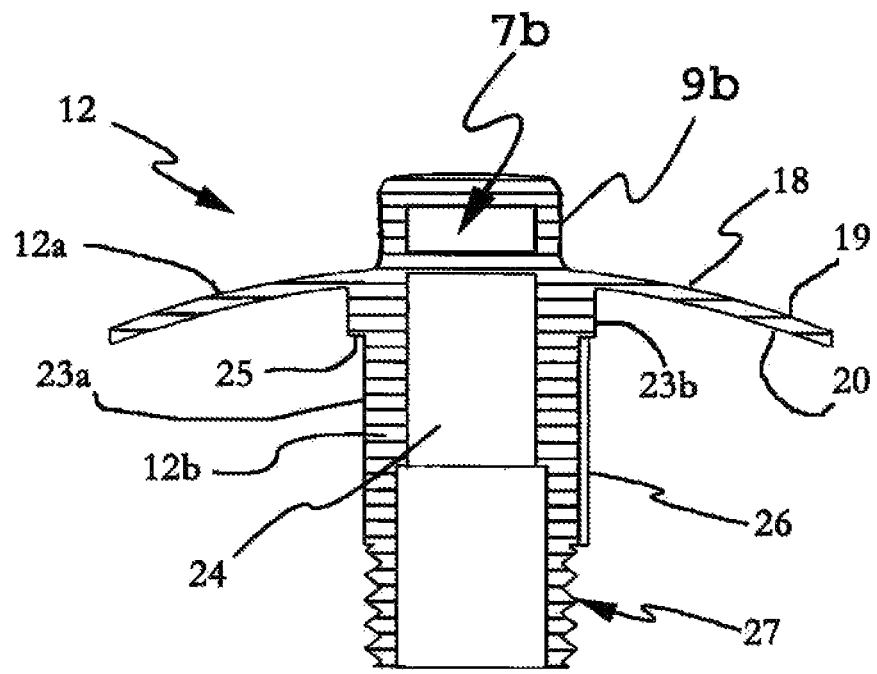
FIG. 3b is a front elevational cross-sectional view for one exemplary embodiment of the dome depicted in FIG. 1 with one embodiment of a suspension interface.

FIG. 3B depicts an alternative embodiment of a ventilator (10b) where center point (21) extends further from the dome (12) and defines suspension interface (9b) further defining interface void (7b) extending through the center point (21) and to the hollow shaft portion.

The dome (12) may further includes a shaft portion (12b) that extends downwardly from the center of the circular plate (18). For the presently preferred embodiment, the dome portion (12a) and the shaft portion (12b) comprise a single member, i.e. the dome (12). Shaft portion (12b) includes a blind axial opening (24) suitably sized to receive a support structure (100) (see FIG. 2, FIG. 18). The blind axial opening (24) can be of a single diameter, tapered, or of stepped, multiple diameters to accept poles of different diameters. The opening is "blind" as it is closed at one end (i.e. the hole does not go all the way through). For one alternative embodiment, such the axial opening (24) is not blind.

The outer diameter of the shaft portion (12b) includes a first-shaft-diameter (23a) and a larger second-shaft-diameter (23b), thereby defining a step or flanged surface (25) there between. In addition, one or more axial keys (26) extend along at least a portion of the length of the smaller first-shaft-diameter (23a) of shaft portion (12b). Screw threads (27) are provided at the bottom of the smaller first-shaft-diameter (23a) configured for receiving a nut (8). Both the threads and the axial keys may be integrally molded with shaft (12b). The function and characteristics of these features of the shaft portion (12b) are further described below. For one alternative embodiment, as described later, the free end of the shaft portion (12b) may define a swivel interface.

The slightly thicker center portion (21) of the circular plate (18) is provided to furnish extra strength to the dome in the event that a pole (100) (as shown in phantom in FIG. 2) is used to raise the cover (11) up and off of the covered vehicle or other device being protected by the cover (11). Of course, the circular plate (18) can be made sufficiently thick so that the center portion (21) has the same thickness as a circular plate (18). As noted above, further alternative embodiments include plate members that can be of variable thickness and that having other than a circular configuration (such a square so that it is more difficult for a ventilator (10) to roll when merely lying on a surface such as a table, for example).

Figure 3A:
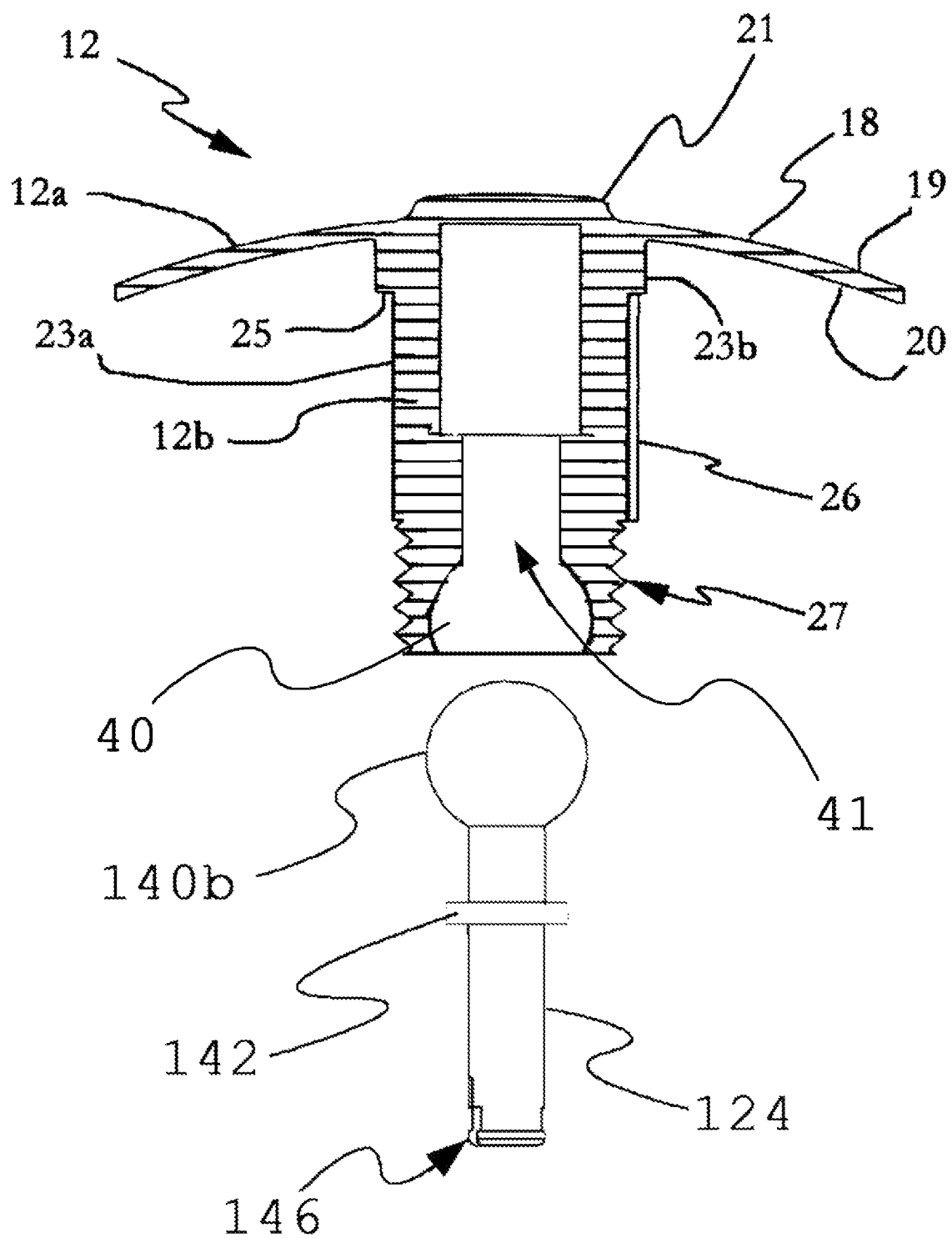
FIG. 3a is an exploded view of a dome and swivel interface system showing a side elevational cross-sectional view for one example of the dome depicted in FIG. 1 further defining a swivel interface (40)
Figure 3C:
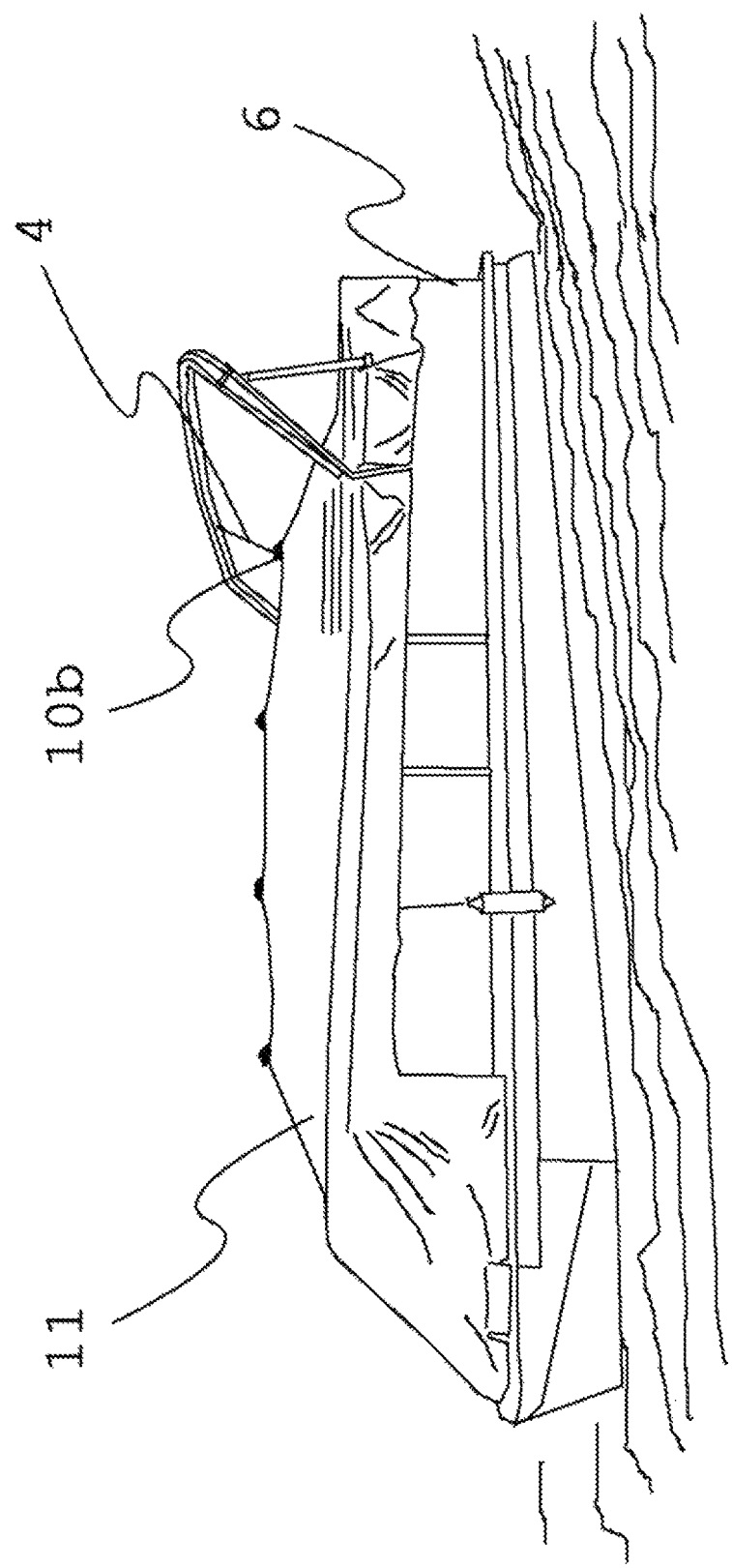
FIG. 3c is a side perspective view showing a plurality of ventilator/support devices associated with a boat cover with at least one support device comprising a suspension interface (10b) being secured to an elevated support structure by a tether.
Figure 3D:
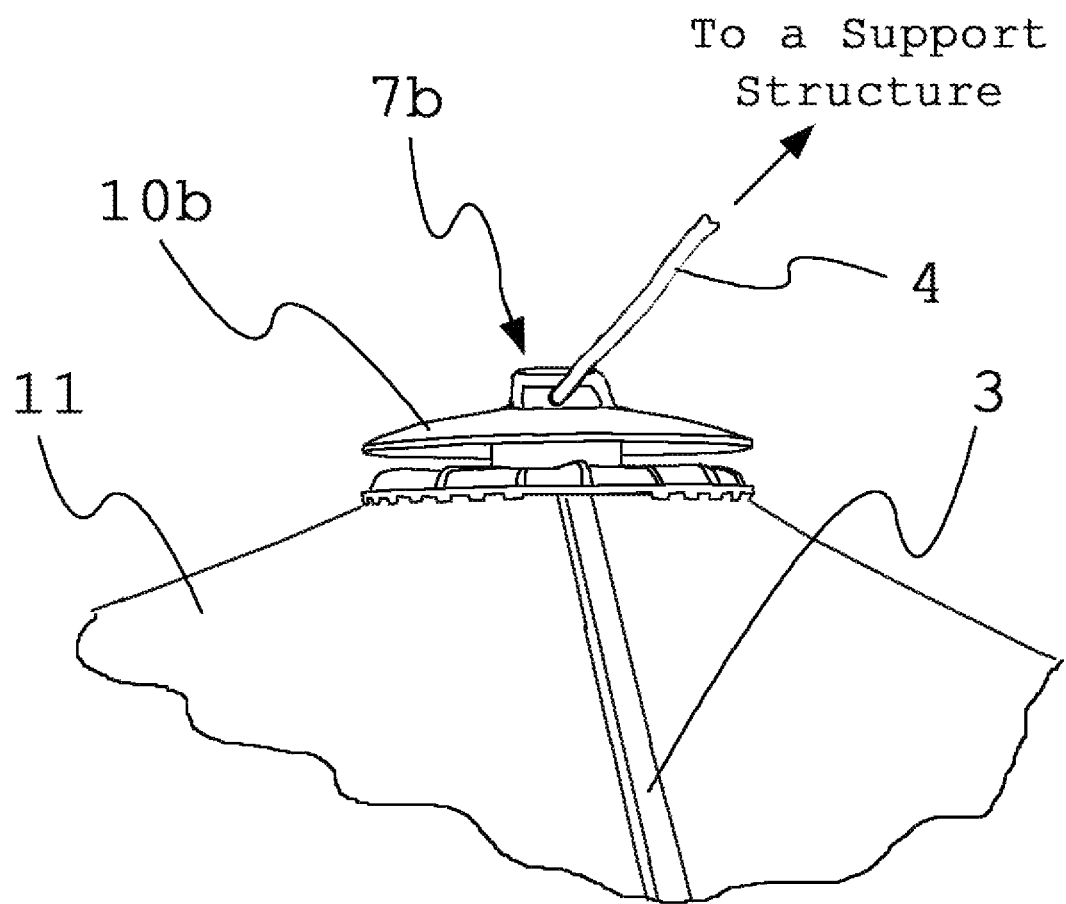
FIG. 3d is a close-up side elevational view of one embodiment of the present invention with a suspension interface as it may appear in practice attached to a cover.

In FIG. 3a, yet another alternative embodiment of the invention is presented. For this current embodiment, shaft portion (12b) further defines dome-to-swivel-interface (40) configured for receiving a swivel-to-dome-interface (140b) defined by one embodiment of a swivel element (124). The features of such a configuration are defined in detail below for a swivel device (120), and the disclosure there applies here. However, it should be appreciated that the dome-to-swivel-interface (40) may optionally define void (41) through which a support rod may be inserted instead of a swivel element (124).

Referring now to FIG. 4 through FIG. 9, features of a first ventilator plate (14) are considered. For the purposes of this discussion, the first ventilator plate (14) may be considered and described as a female ventilator plate. It should be appreciated, however, that embodiments where the first and second ventilator plates are substantially identical (not male or female) fall within the scope of the present invention. It should also be appreciated that in the following exemplary embodiment description, the first ventilator plate (14) is used on the "outside" or as the outer portion ventilator plate as described above. However, the novel improvements to the ventilator plates allow such plates to be interchangeable so that either ventilator plate (14) or ventilator plate (16) may be used as the outer portion ventilator plate or inner portion ventilator plate.

Referring to FIG. 4-9, the first ventilator plate (14) comprises two opposed surfaces defining a circular plate. For the presently preferred embodiment, the first ventilator plate (14) has an outer diameter that is substantially the same as that of the dome (12). One ventilator plate surface is referred to as the gusset-surface (29a) and can be best seen in FIG. 4 and FIG. 8. The opposing surface to the gusset-surface is referred to as the gripping-surface (29b) and can be best seen in FIG. 5. and FIG. 9. The first ventilator plate (14) may comprise a circular venting section (35), which further defines a plurality of vent holes (30) that extend through the entirety of the venting section (35). The first ventilator plate (14) defines four pairs of vent holes (30), although any number of holes may be used.

Figure 4:
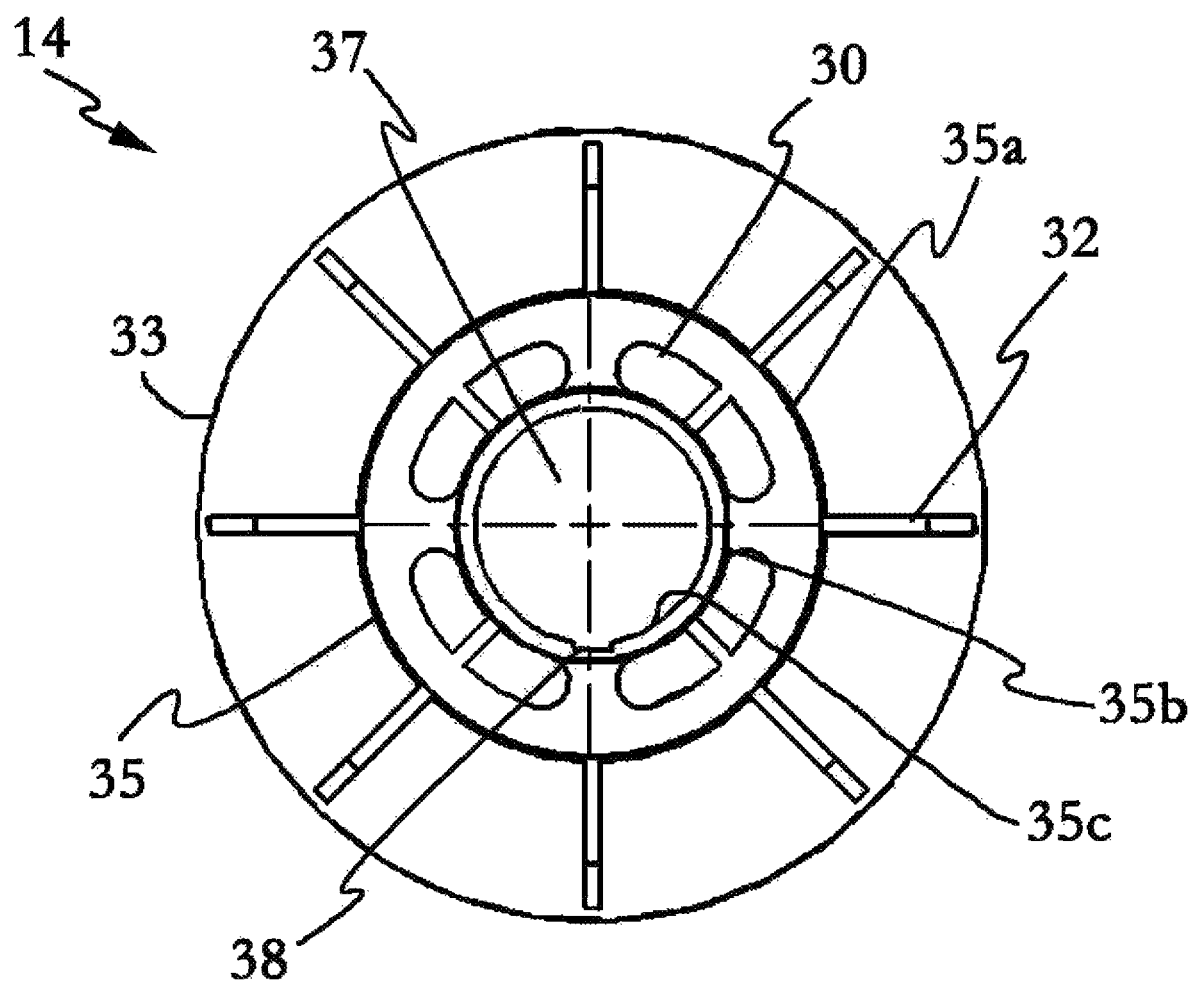
FIG. 4 is a top plan view of the gusset-surface of a female ventilator plate according to one possible embodiment of the invention.
Figure 8:
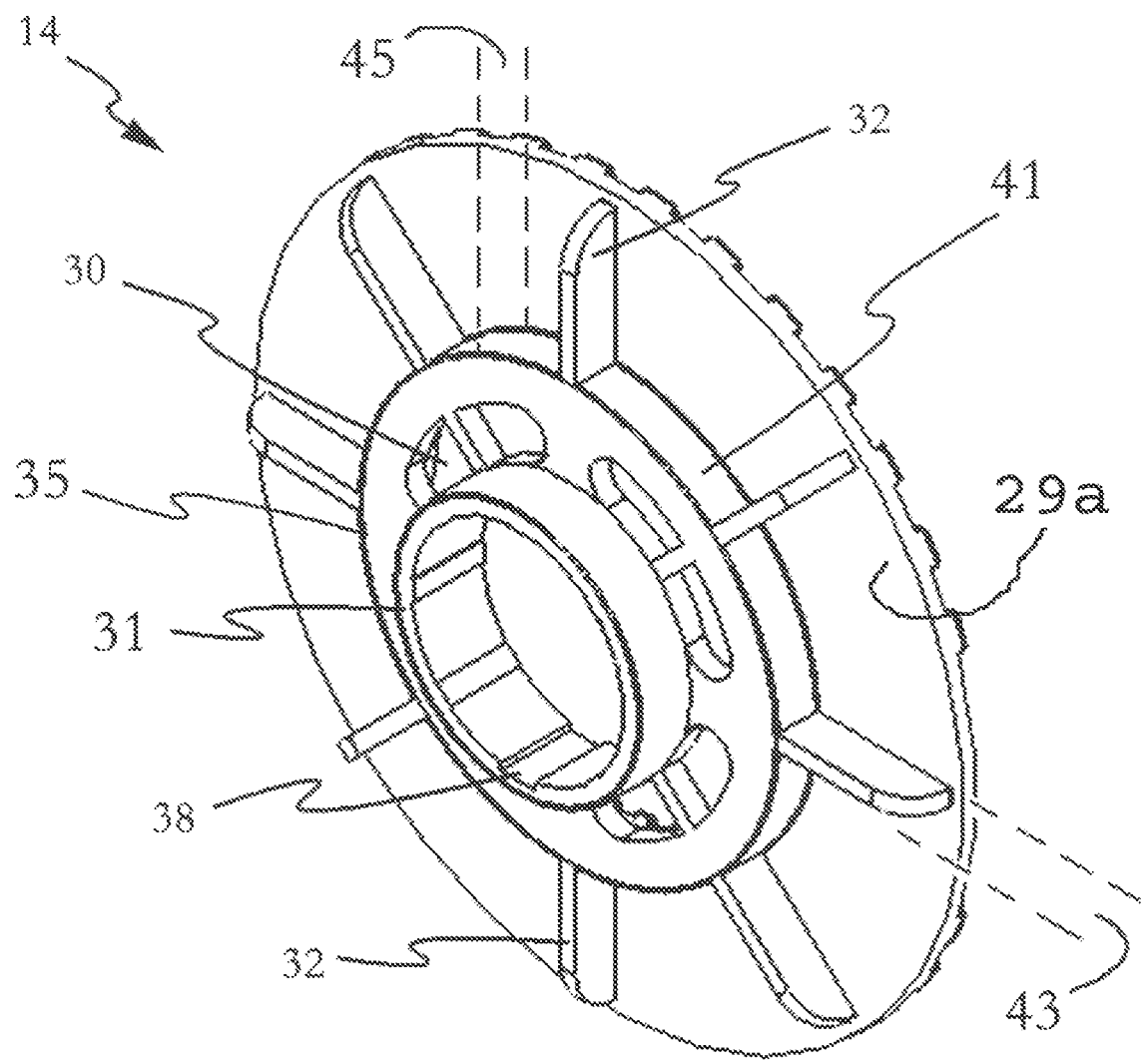
FIG. 8 is a perspective view of the gusset-surface depicted in FIG. 4.

As can be seen in FIG. 4 and FIG. 8, the circular venting section (35) may have a generally circular outer diameter (35a) and a generally circular inner diameter (35b). The vent holes (30), defined by section (35), may be disposed between the outer diameter (35a) and the diameter (35*b*). Adjacent to the air vent section is a generally circular shaft receiver (31) (FIG. 8), having a generally circular outer diameter of about (35*b*, FIG. 4) and a generally circular inner diameter of (35*c*). The shaft receiver (31, FIG. 6 and 7) defines center opening (37, FIG. 4) located at the center of first ventilator plate (14). Shaft receiver (31) may be suitably sized to receive the shaft portion (12*b*) so that the annular surface (or edge) of the shaft receiver (31) associates with the step (25) (FIGS. 2 and 3) to provide a predefined gap (5) (FIG. 2) between the circular plate (18) and the first ventilator plate (14). One or more axial keyways (38) may be provided along the inside wall of the shaft receiver (31) where such axial keyways (38) are configured to receive one or more keys (26) (FIG. 3) in order to align the ventilator plate and prevent rotation of the ventilator plate relative to the shaft portion (12*b*). The key (26) may be defined by shaft portion (12*b*).

The first ventilator plate (14) may be optionally glued or otherwise fixed to shaft portion (12*b*), but alternatively can be press fitted, fastened, or integrally formed with the shaft portion (12*b*) to maintain the first ventilator plate's relative position with the dome (12). As a further alternative, the dome (12) and the first ventilator plate member (14) may define a single member.

Figure 10:
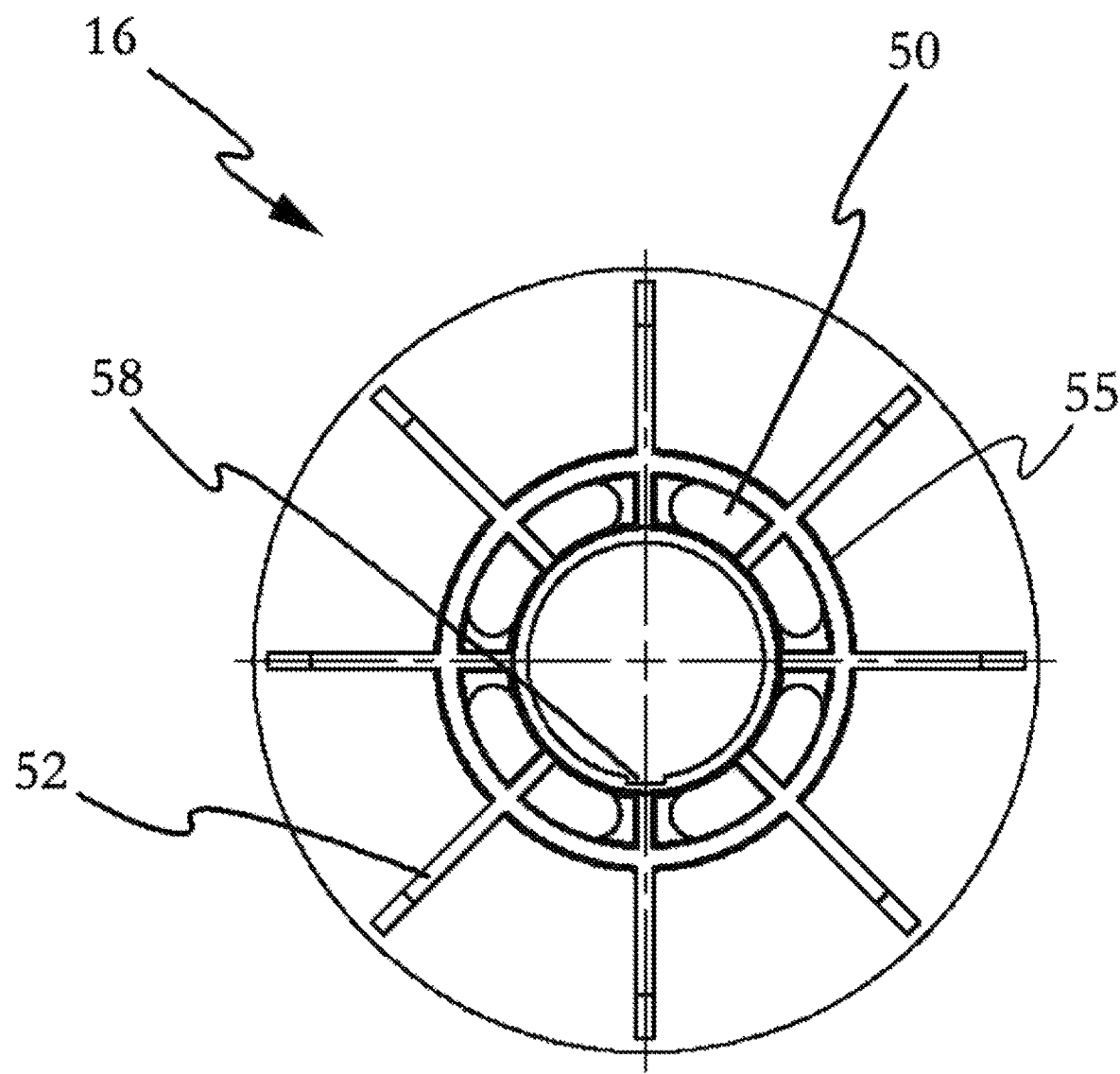
FIG. 10 is a top plan view of the gusset-surface of a male ventilator plate according to one possible embodiment of the invention.

Attention is now directed to the gusset-surface (29*a*) of the first ventilator plate (14). As noted above, the circular venting section (35) may define a circular section that has a generally circular outer diameter (35*a*) and a generally circular inner diameter (35*b*). As best viewed in FIG. 8, the circular venting section (35) may extend beyond the gusset-surface (29*a*) a predefined distance thereby defining vent height (45). Also depicted in FIG. 10 and FIG. 8, a plurality of gusset supports (32) extend radially outward from the circular venting section (35) and along the surface of the first ventilator plate (14) toward the outer diameter of the first ventilator plate (14). Such gusset supports (32) may connect the surface of the first ventilator plate (14) to the side of the circular venting section (35), thereby reinforcing the surface of the first ventilator plate (14).

Figure 6:
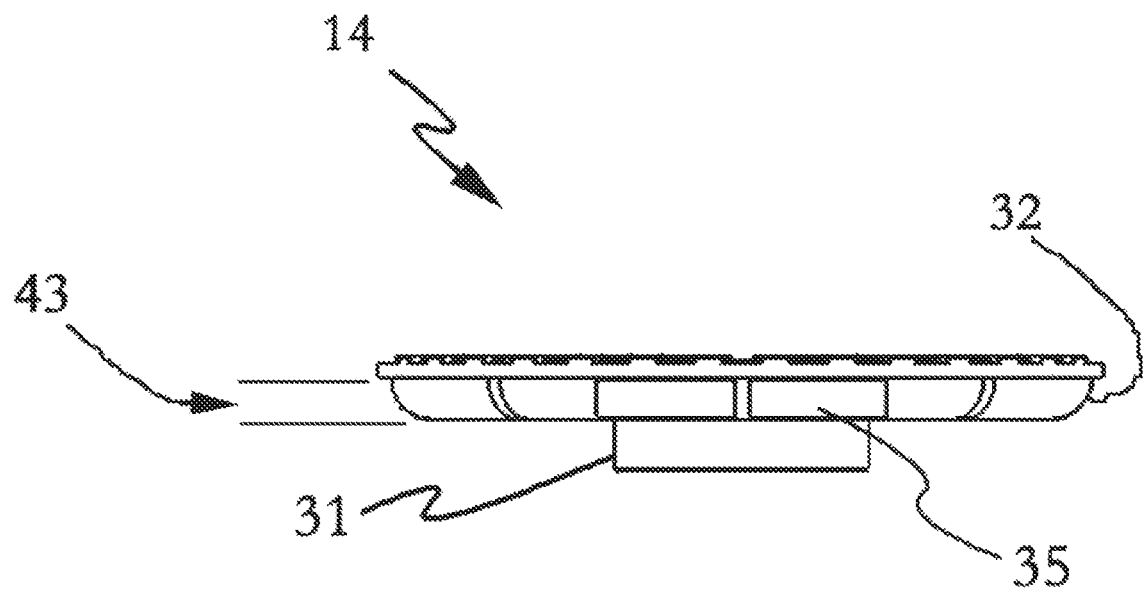
FIG. 6 is a side elevational view of a female ventilator plate according to one possible embodiment of the invention showing a continuous gripping region.
Figure 7:
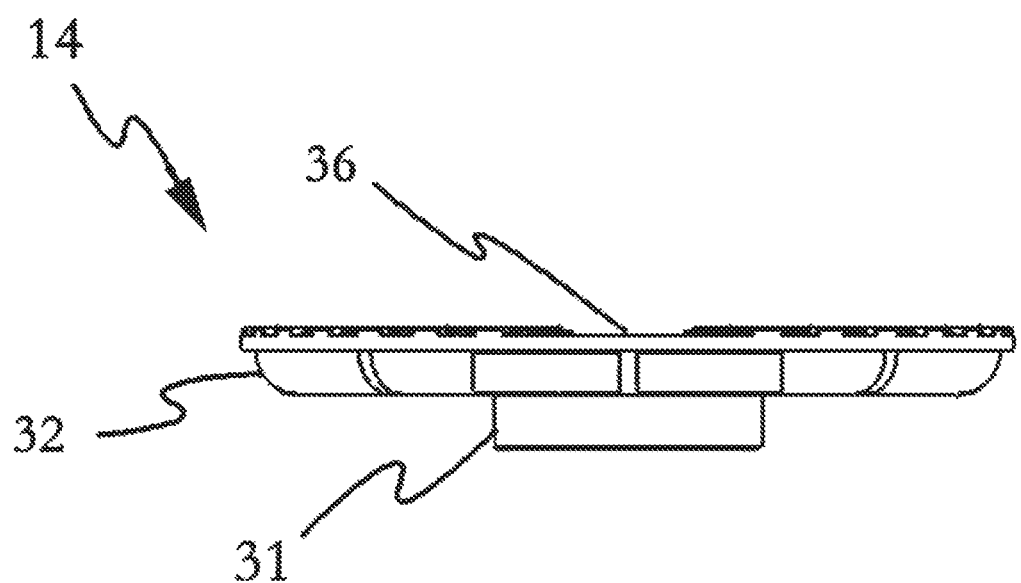
FIG. 7 is a side elevational view of a female ventilator plate according to one possible embodiment of the invention showing two gripping regions separated by a seam channel.

In addition, the gusset supports (32) extend perpendicularly from the gusset-surface a predefined gusset height (43) (FIG. 6, FIG. 8). For the current embodiment, the gusset height (43) is substantially equal too or less than the vent height (45). It should be noted, however, that greater gusset heights (43) fall within the scope of the present invention.

One of ordinary skill in the art will appreciate that such a configuration improves air flow across the vent holes (30) thereby providing an improved venturi feature. For such a configuration, when air flows across the circular venting section (35) (due to wind or the vehicle being in tow or other reasons), air flows along the concave under surface (20) creating a low pressure region above vent holes (30) thereby creating a suction effect which in turn improves air flow/exchange between the "inside" and "outside" of the cover (11).

Figure 5:
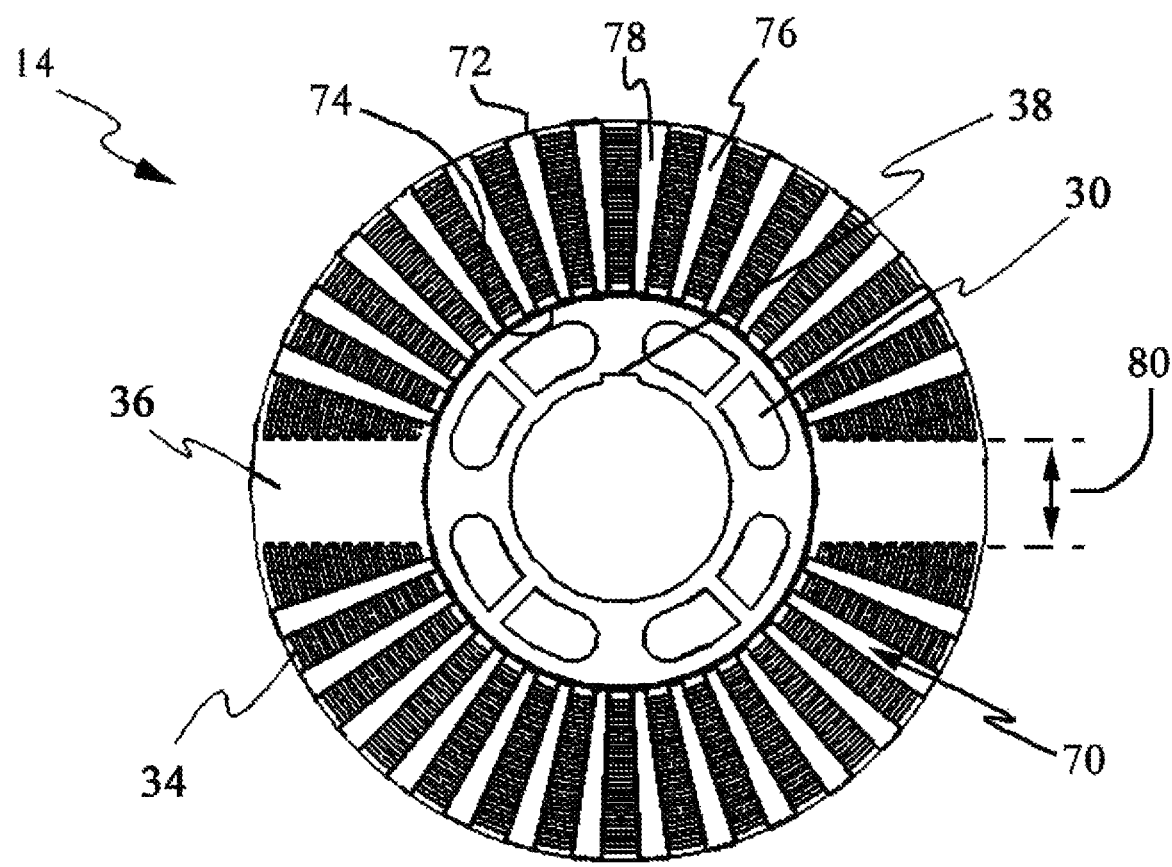
FIG. 5 is a bottom plan view of the griping-surface of a female ventilator plate according to one possible embodiment of the invention.
Figure 9:
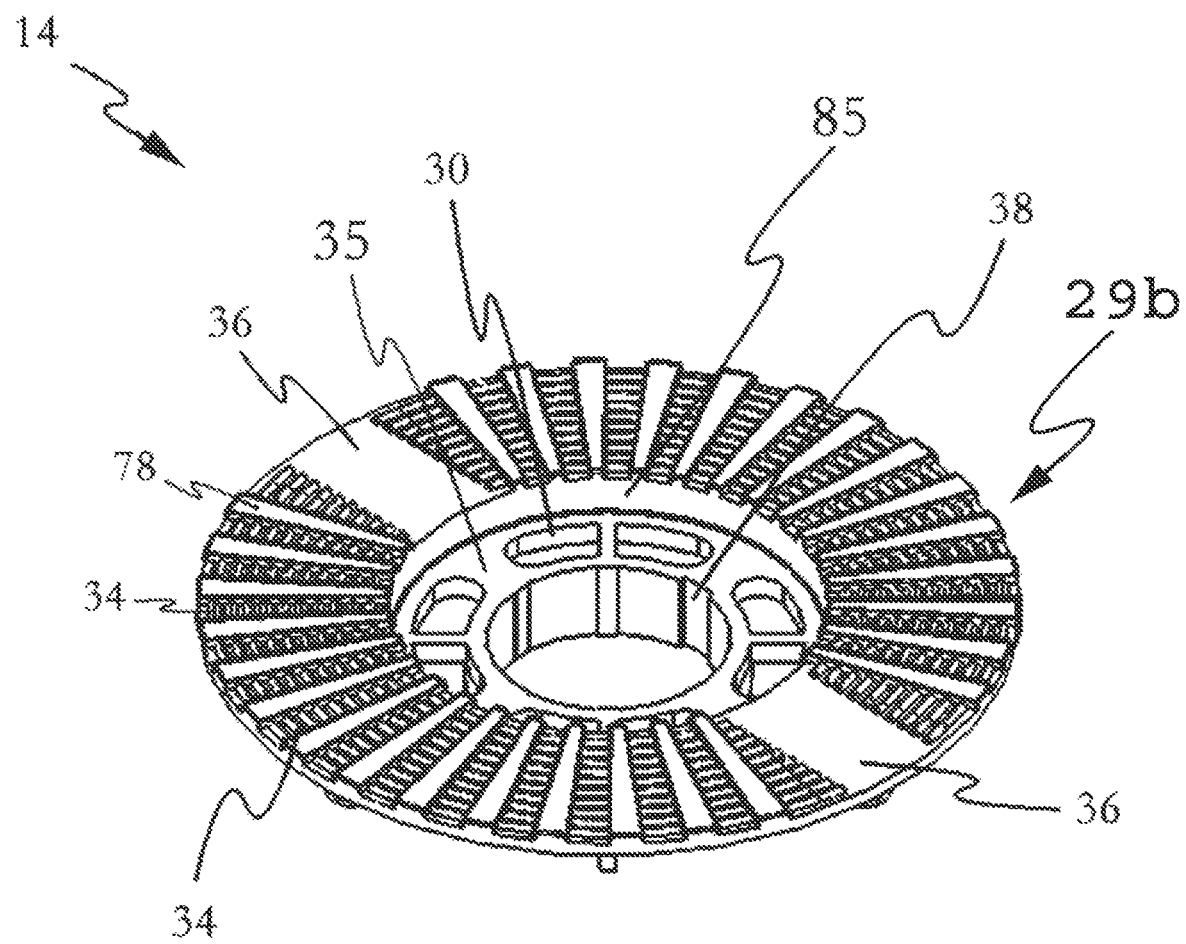
FIG. 9 is a perspective view of the gripping-surface depicted in FIG. 5.

As best seen in FIG. 5 and FIG. 9, the gripping surface of the first ventilator plate (14) is considered. The gripping surface of the first ventilator plate (14) includes an annular gripping-region (70) having an outer-gripping-diameter (72) and an inner-gripping-diameter (74). A plurality of gripping-strips (34) extend along the gripping region (70) from about the inner-gripping-diameter (74) to about the outer-gripping-diameter (72). Each gripping-strip (34) defines a series of alternating ridges and grooves (corrugations) wherein such ridges extend perpendicularly from the gripping surface a predefined gripping-ridge-height. As shown in FIG. 5 and FIG. 9, each adjacent gripping-strip is separated by an alignment-tooth (78) with the exception of the griping-strips that are adjacent to a seam-channel (36) (described later). For the present embodiment of the invention, each alignment-tooth (78) extends perpendicularly from the gripping surface to a predefined alignment-tooth-height. Preferably, the alignment-tooth-height is greater than the gripping-ridge-height thereby forming a raised section between each gripping-strip (34). For the presently preferred embodiment, the gripping surface of the first ventilator plate (14) comprises thirty gripping-strips (34).

Referring now to FIG. 5, the gripping surface of first ventilator plate (14) further defines seam-channels (36) free from gripping-strips (34). Preferably, the seam-channels are disposed on opposing sides of gripping-region (70) as shown in FIG. 5 and FIG. 9 so that gripping-strips (34) are divided into two equal gripping sections. It should be appreciated, however, that any number of seam-channels may be use and their locations within the gripping region selected as desired for the application of interest. The Seam-channels (36) may have a predefined seam-channel-width (80) that is suitably sized to receive the seam of a cover that is to be used with the ventilator (10). Such a configuration allows the ventilator (10) to be installed directly over the seam of a cover while still providing a more even clamping force to the cover along gripping-region (70).

Referring now to FIG. 10 through FIG. 15, features of a second ventilator plate (16) are considered. For the purposes of this discussion, the second ventilator plate (16) may be considered and described as a male ventilator plate. It should be appreciated, however, that embodiments where the first and second ventilator plates are substantially identical (not male or female) fall within the scope of the present invention.

The second ventilator plate (16) comprises two opposed surfaces defining a circular plate. One such surface is referred to as the gusset-surface and can be best seen in FIG. 10 and FIG. 14. The opposing surface to the gusset-surface is referred to as the gripping-surface and can be best seen in FIG. 11 and FIG. 15. For the presently preferred embodiment, the second ventilator plate (16) has an outer diameter that is substantially the same as that of first ventilator plate (14).

Figure 15:
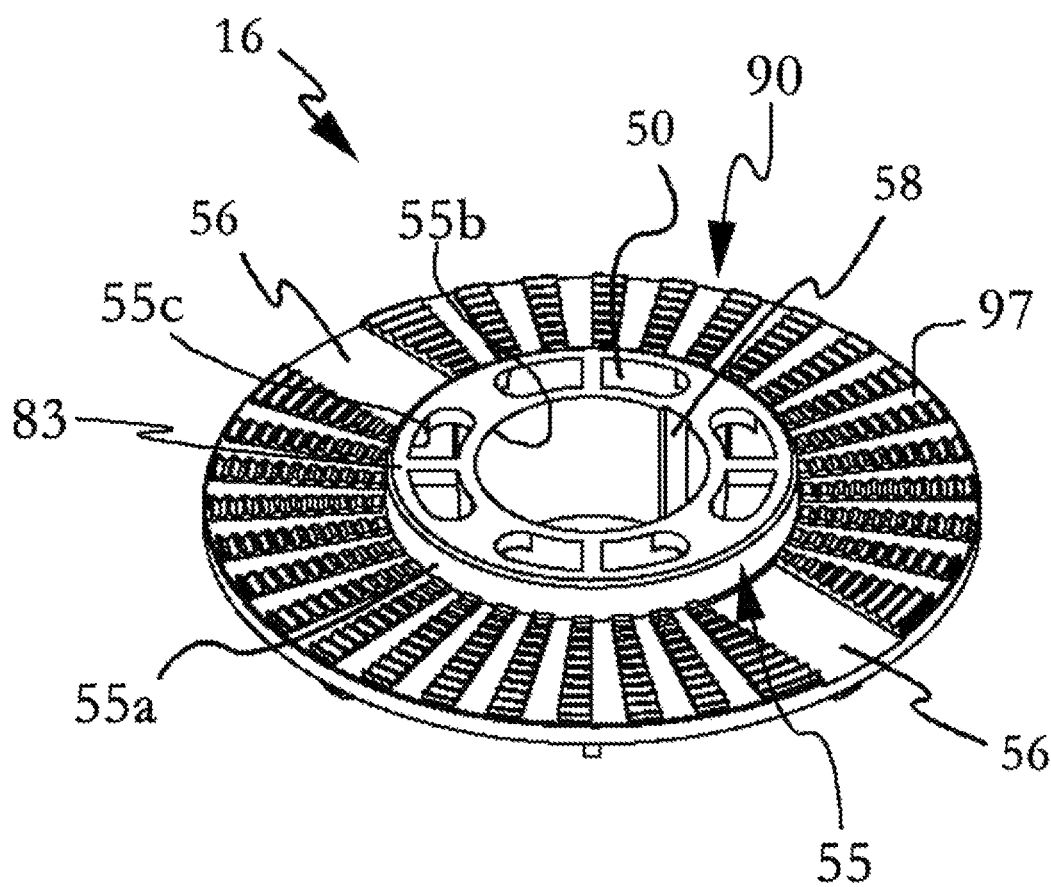
FIG. 15 is a perspective view of the gripping-surface depicted in FIG. 11.

Second ventilator plate (16) comprises circular venting section (55) which further defines a plurality of vent holes (50) that extend through the entirety of the circular venting section (55). While any number of holes may be used, the current embodiment defines four pairs of vent holes. As can be seen in FIG. 15, the circular venting section (55) has a generally circular outer diameter (55*a*) and a generally circular inner diameter (55*b*). The vent holes (50) are defined by the circular vent section (55) disposed between the outer diameter (55*a*) and the inner diameter (55*b*). The circular vent section (55) further extends perpendicularly outward from the gripping-surface a predefined vent-section-height (79) (FIG. 12) forming a male-vent-section (83) (FIG. 15). The outer diameter (55*a*) distance is preferably slightly less than the circular venting section (35) outer diameter (35a) for the first ventilator plate. Similarly, the vent-section-height (79) is preferably substantially equal to the vent height (45) (FIG. 8) for the first ventilator plate. Such a configuration allows male-vent-section (83) to be received by the air-vent-receiver (85) (FIG. 9) defined by first ventilator plate (14).

Adjacent to the circular venting section is generally circular shaft receiver (87) (FIG. 14) having a generally circular outer diameter (55*b*) and a generally circular inner diameter (55*c*). The shaft receiver (87) defines center opening (84) located at the center of the second ventilator plate (16). One or more axial keyways (58) may be provided along the inside wall of shaft receiver (87) where such axial keyways (58) are configured to receive one or more keys (26) (FIG. 3) in order to align the ventilator plate relative to the other pieces and prevent rotation of the ventilator plate about shaft portion (12b).

Figure 14:
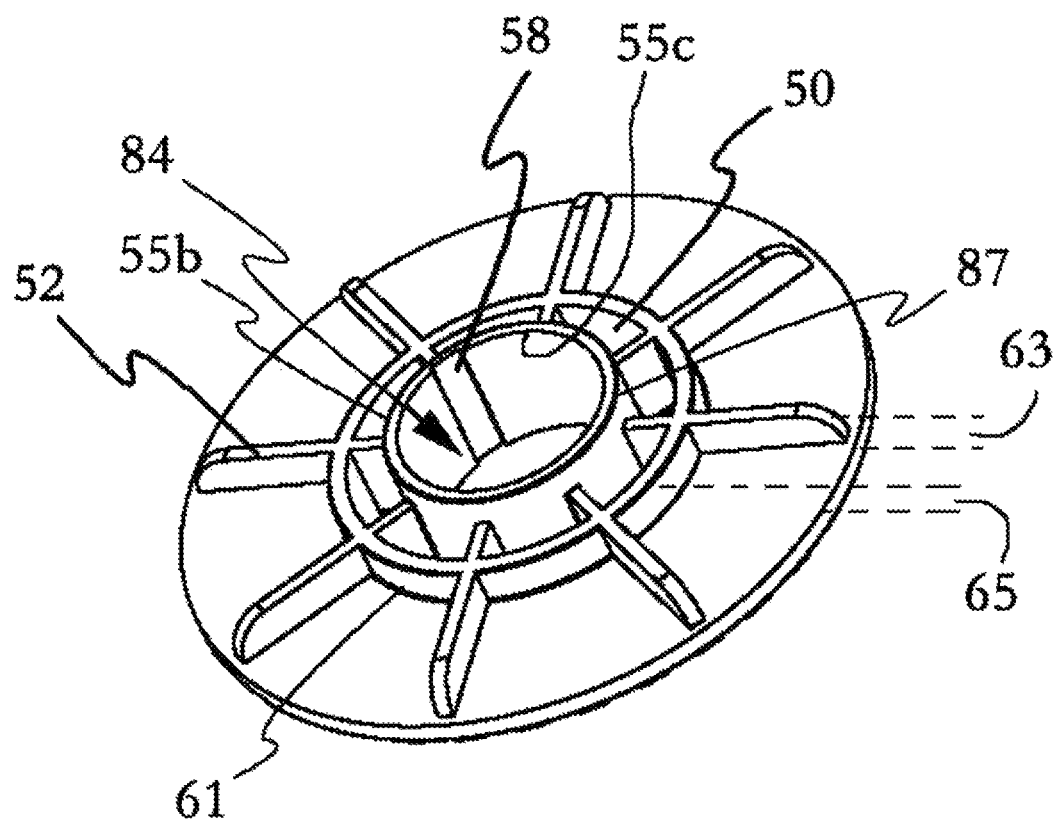
FIG. 14 is a perspective view of the gusset-surface depicted in FIG. 10.

Still referring now to FIG. 14, attention is directed to the gusset-surface of the second ventilator plate (16). As noted above, the circular shaft receiver (87) has a generally circular outer diameter (55b) and a generally circular inner diameter (55c). Adjacent to circular shaft receiver (87) is the air vent section defining vent holes (50). Adjacent to vent holes (50) is an annular vent-wall (61) configured to prevent water and other materials from sliding across the gusset-surface and into vent-holes (50). A plurality of gusset supports (52) extend radially outward from the shaft receiver (87), through the annular vent-wall (61) and along the surface of the second ventilator plate (16) toward the outer diameter of the second ventilator plate (16). Such gusset supports (52) connect the surface of the second ventilator plate (16) to the side of the shaft receiver (87) and the annular vent-wall (61), thereby reinforcing the surface of the second ventilator plate (16).

Gusset supports (52) also extend perpendicularly from the gusset-surface a predefined gusset height (63). The gusset height (63) may be substantially equal too or less than the vent-wall-height (65). It should be noted, however, that greater gusset heights (63) fall within the scope of the present invention as long as the air is allowed to flow across the vent holes (50) freely. As before, one of ordinary skill in the art will appreciated that such a configuration improves air flow across vent holes (50), thereby providing an improved venturi feature.

Figure 11:
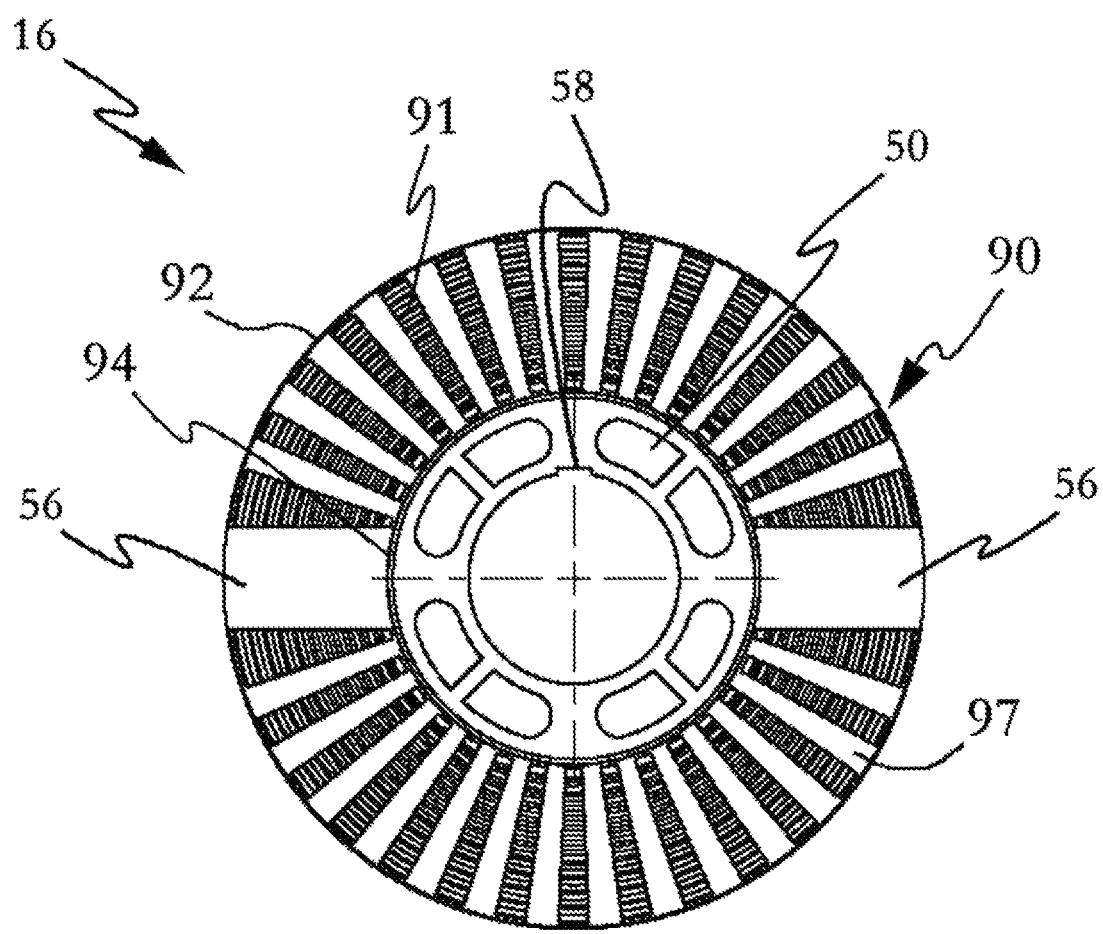
FIG. 11 is a bottom plan view of the griping-surface of a male ventilator plate according to one possible embodiment of the invention.
Figure 12:
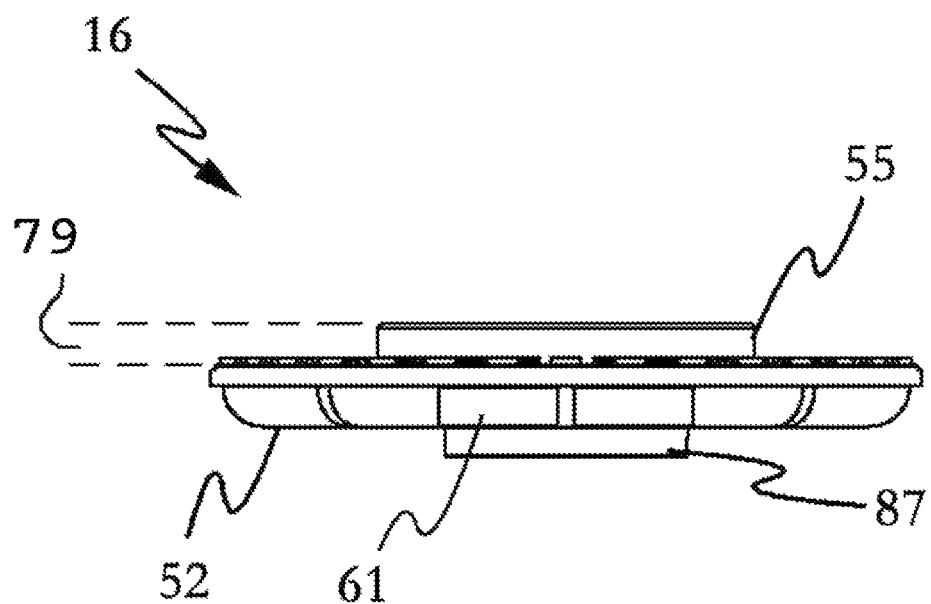
FIG. 12 is a side elevational view of a male ventilator plate according to one possible embodiment of the invention showing a continuous gripping region.
Figure 13:
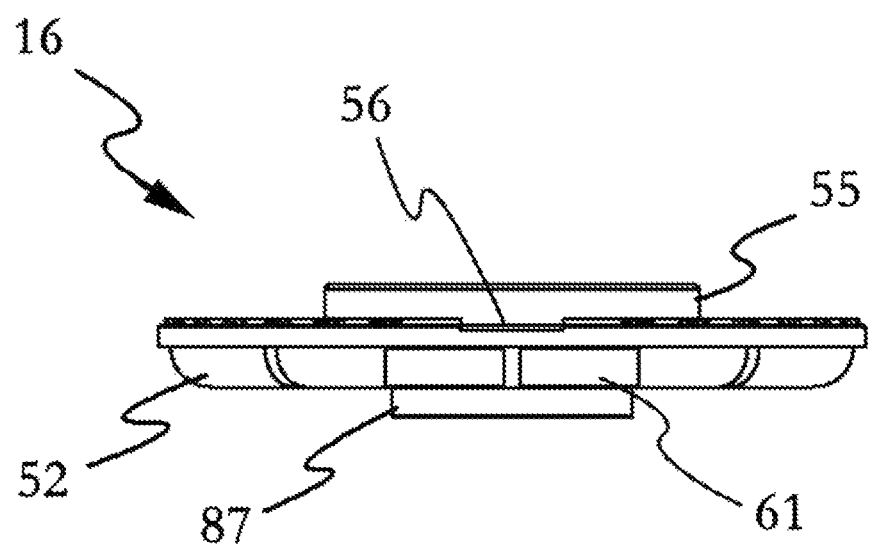
FIG. 13 is a side elevational view of a male ventilator plate according to one possible embodiment of the invention showing two gripping regions separated by a seam channel.

As best seen in FIG. 11 and FIG. 15, the gripping surface of the second ventilator plate (16) is examined. The gripping surface of the second ventilator plate (16) includes an annular gripping-region (90) having an outer-gripping-diameter (92) and an inner-gripping-diameter (94). A plurality of gripping-strips (91) extend along the gripping region (90) from about the inner-gripping-diameter (94) to about the outer-gripping-diameter (92). Each gripping-strip (91) defines a series of alternating ridges and grooves (corrugations) wherein such ridges extend perpendicularly from the gripping surface a predefined gripping-ridge-height. As shown in FIG. 11 and FIG. 15, each adjacent gripping-strip is separated by a non-gripping-strip section. Such non-gripping-strip sections form a channel defining alignment-teeth-receivers (97). For the presently preferred embodiment, the gripping-ridge-height for both ventilator plates is substantially equal so that the alignment-teeth (78) of first ventilator plate (14) are received by the alignment-teeth receivers (97) when the ventilator (10) is assembled so that the gripping surface of both ventilator plates apply a more uniform and secure clamping force to cover (11). In addition, the gripping-strips (91) are disposed at a point along the gripping-surface relative to the axial keyway (58) that allows alignment-teeth (78) to align with the alignment-teeth-receivers (97) of first ventilator plate (14) when ventilator (10) is assembled.

Referring now to FIG. 15, the gripping surface of the second ventilator plate (16) further defines seam-channels (56) free from gripping-strips (91). The seam-channels may be disposed on opposing sides of the gripping-region (90), as shown in FIG. 11 and FIG. 15 so that gripping-strips (91) are divided into two equal gripping sections. It should be appreciated, however, that any number of seam-channels may be used and their locations within the gripping region selected as desired for the application of interest. The Seam-channels (56) have a predefined seam-channel-width that is substantially equal to seam-channel-width (80) for the first ventilator plate (14). In addition, the seam-channels (56) are disposed along the gripping-surface at a point relative to the axial keyway (58) that allows seam-channels (56) to align with seam-channels (36) when ventilator (10) is assembled.

As described above, when the second ventilator plate (16) is associated with shaft portion (12b) of the dome (12), the one or more keyways (58) orient the second ventilator plate (16) with the first ventilator plate (14) such that the air vent holes (30) and air vent holes (50) are aligned providing an air flow path between the "inside" of the cover to the "outside."

Figure 16:
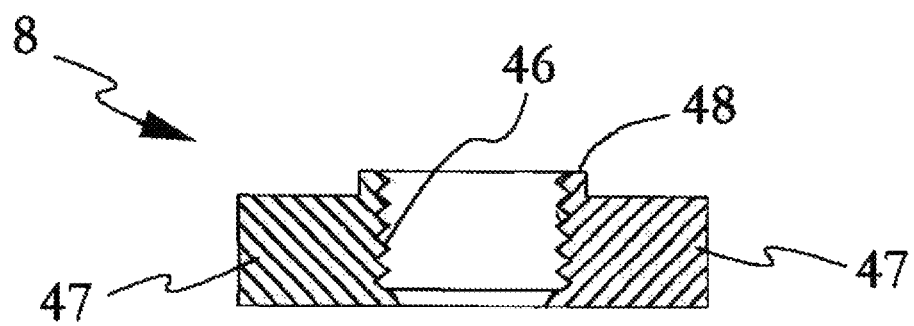
FIG. 16 is a side elevational cross-sectional view of the nut of the embodiment shown in FIG. 1 taken along the line 1-1 of FIG. 17.
Figure 17:
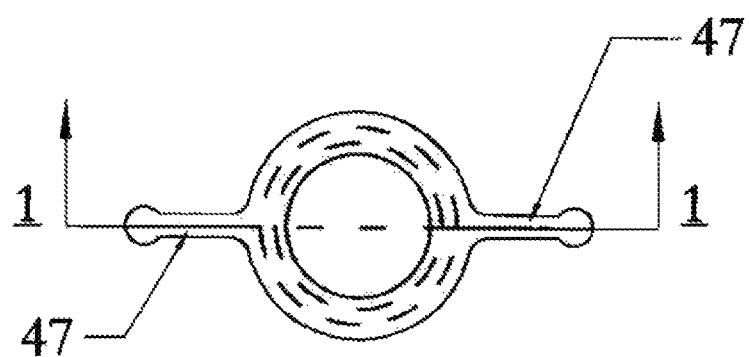
FIG. 17 is a top plan view of the nut of FIG. 1 and FIG. 16.

Referring now to FIG. 16 and FIG. 17, one exemplary fastening device (8) is depicted. The fastening device is configured to secure and associate the second ventilator plate (16), the first ventilator plate (14), and dome (12) together. Such a fastening device may be a nut (8). The nut (8) may comprise an internal screw thread (46) sized to mate with the external threads (27) at the bottom of the shaft portion (12b) (FIG. 3). A number of alternative fastening devices may be used in place of the illustrated screw threads and nut. For example, a pin in association with a camming slot, a lever-operated cam lock, and other like/suitable attaching means known in the art may be used. In the illustrated embodiment, a pair of oppositely disposed wings (47) extend from the outer diameter of the nut (8) to permit hand tightening. A hexagonal configuration (or other suitable configurations) can alternatively be used in lieu of wings (47). The clamping feature between the two ventilator plates and cover (11) is achieved by tightening the nut (8), so that top annular surface (48) of the nut (8) bears against an annular surface defined by the second ventilator plate (16) forcing the ventilator plates together.

Yet another alternative embodiment for the fastening device comprises a magnetic material disposed in protective material. In that spirit, the nut (8) may be composed of magnetic material or comprise magnetic material disposed in a protective material to protect the item being covered from scratches. When the item being covered is a vehicle, such a fastening device comprises a magnetic plate disposed in a protective housing. The protective housing may be configured for being securely associated with a nut (8). Alternatively, the protective housing comprises inner threads (46) for receiving external threads (27). The magnetic plate and protective housing are appropriately sized for the application of interest.

Support Structure

Flip Lock Pole

Referring back to FIG. 3, it was noted above that the dome (12) defines a shaft portion (12b) that extends downwardly from the center of the dome portion (12a). The shaft portion (12b) includes a blind axial opening (24) suitably sized to receive a support structure such as a pole. The blind axial opening (24) can be of a single diameter, tapered, or of stepped, multiple diameters to accept poles of different diameters.

Figure 18:
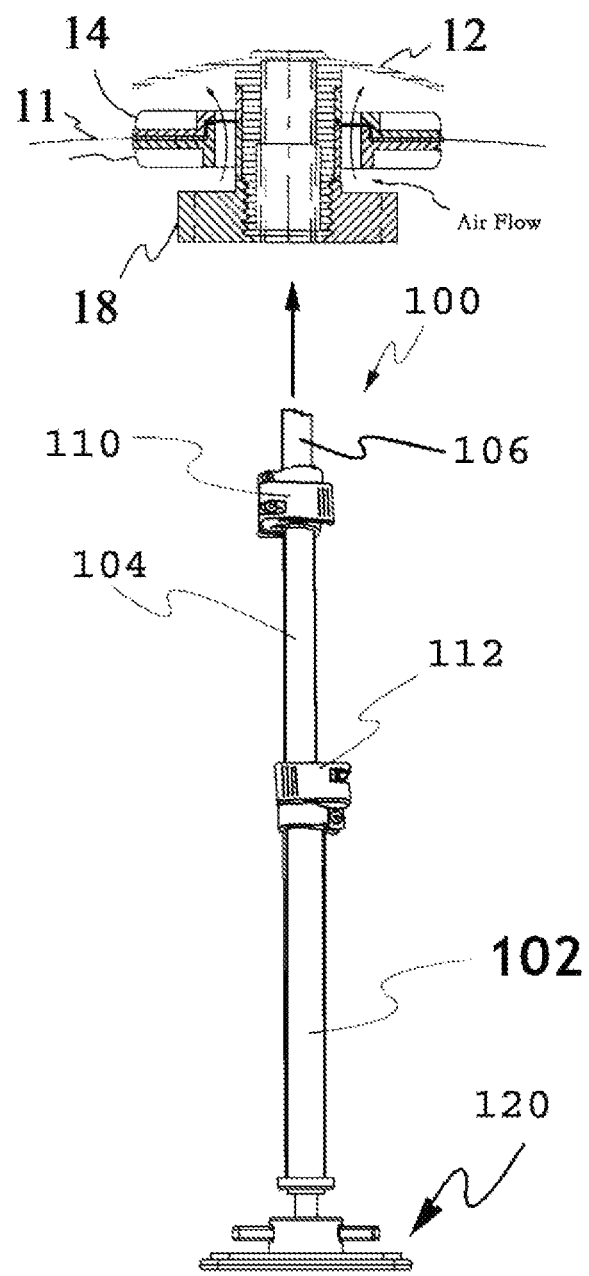
FIG. 18 is a side elevational view of a ventilator-associated with one embodiment of the invention associated with a three-section telescoping pole secured in place by latching devices and further defining a swivel device (120)

Referring now to FIG. 18, in the assembled view of the ventilator shown in FIG. 1 where a cover material (11) is seen to include a hole therethrough with a main portion of the cover material (11) extending radially away from the hole and clamped between the opposed surfaces (15) and (17), of the first ventilator plate (14) and the second ventilator plate (16), respectively. A support structure (100) is configured for being associated with the ventilator (10) and for supporting the ventilator and cover (11) at a desired height. For applications where support structure (100) is used with a cover ventilator (10) as depicted in FIG. 1, and as shown in FIG. 3, the outer diameter of the shaft portion (12b) of ventilator (10) includes a first-shaft-diameter (23a) and a larger second-shaft-diameter (23b) thereby defining a step or flanged surface (25) there between. Such a shaft portion (12b) is thus configured for receiving one end of a support structure (100).

The current embodiment of the inventive flip-lock support structure (100) comprises a first pole-section (102), a second pole section (104), and a third pole section (106). For the present embodiment, the pole sections (102) and (104) are hollow, while the pole section (106) may or may not be hollow. Such pole sections are configured in a telescoping arrangement. Thus, the first pole section (102) has a slightly larger inside diameter than the outside diameter of the second pole section (104), which has a slightly larger inside diameter than the outside diameter of the third pole section (106). Associated with one end of the first pole section (102) is a swivel device (120) configured to selectively secure pole sections (132) and (134) in a desired position. The opposite end of the first pole section (102) may be further associated with an end cap (142).

As depicted in FIG. 18, one end of the second pole section (104) is associated with a first latching device (110), which is configured to selectively secure the pole section (106) in a desired position. The opposing end of the pole section (106) is configured for being associated with the axial opening (24) of ventilator (10).

Similarly, one end of the pole section (102) is associated with a latching device (112) configured to selectively secure the pole section (104) is a desired position. The opposing end of the pole section (102) is associated with a swivel device (120). It should be appreciated that the disclosed support structures can be used to support many different items in addition to cover ventilators.

The support structure (100) may be constructed to minimize weight so that it may be easily carried and adjusted using one hand. Thus, all pole sections preferably define a thin hollow pole made from a light weight material such as aluminum, where the inner profile of such tubing is ribbed for added strength.

Swivel Device

Figure 19:
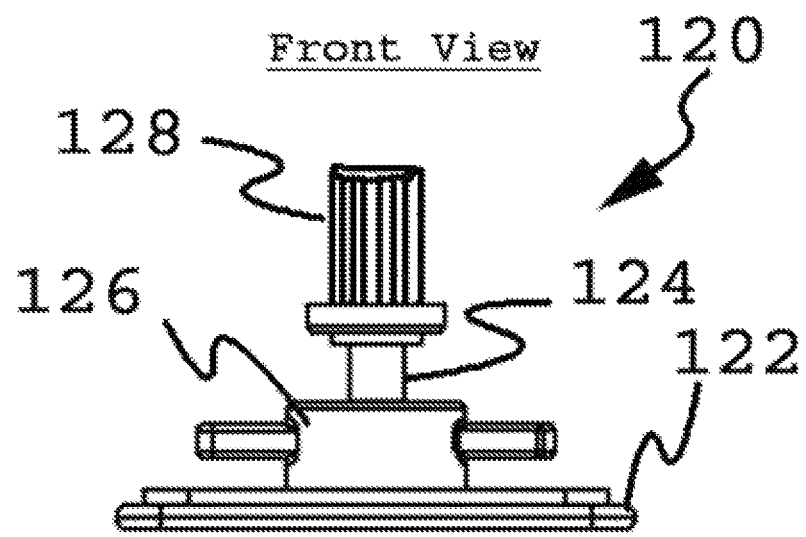
FIG. 19 is a front elevational view of one embodiment of a swivel device.
Figure 20:
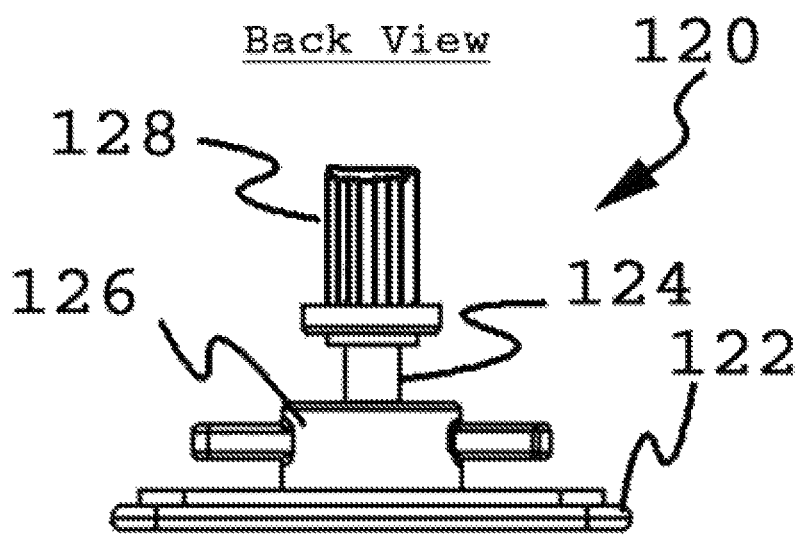
FIG. 20 is a back elevational view of the swivel device depicted in FIG. 19.
Figure 21:
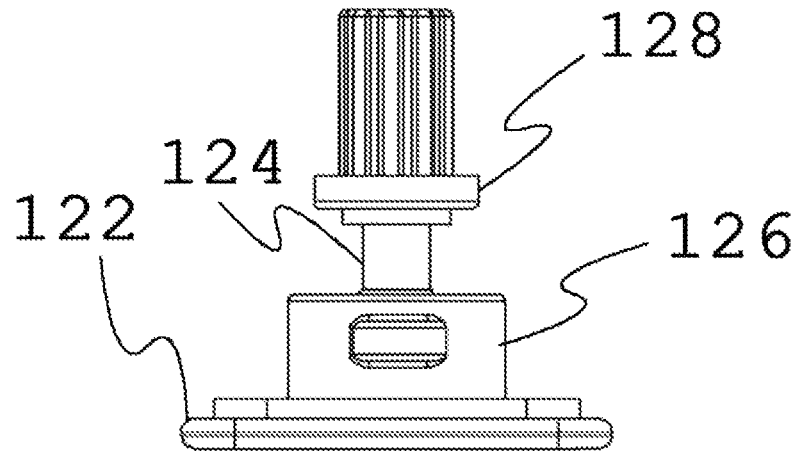
FIG. 21 is a right side elevational view of the swivel device depicted in FIG. 19.
Figure 22:
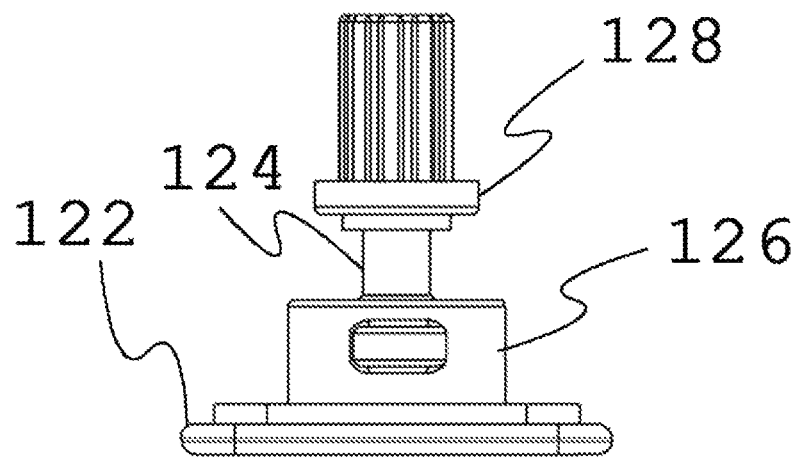
FIG. 22 is a left side elevational view of the swivel device depicted in FIG. 19.
Figure 23:
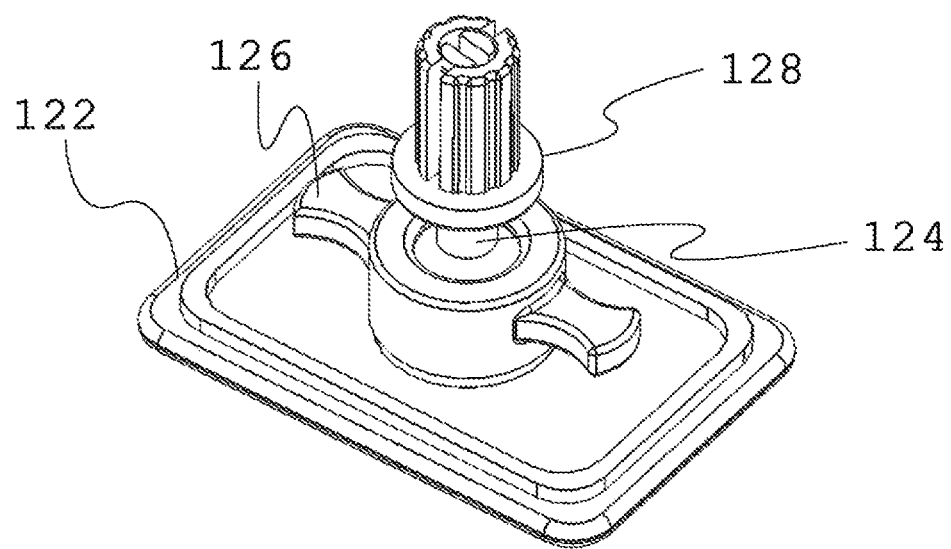
FIG. 23 is an elevated perspective view of the swivel device depicted in FIG. 19.
Figure 24:
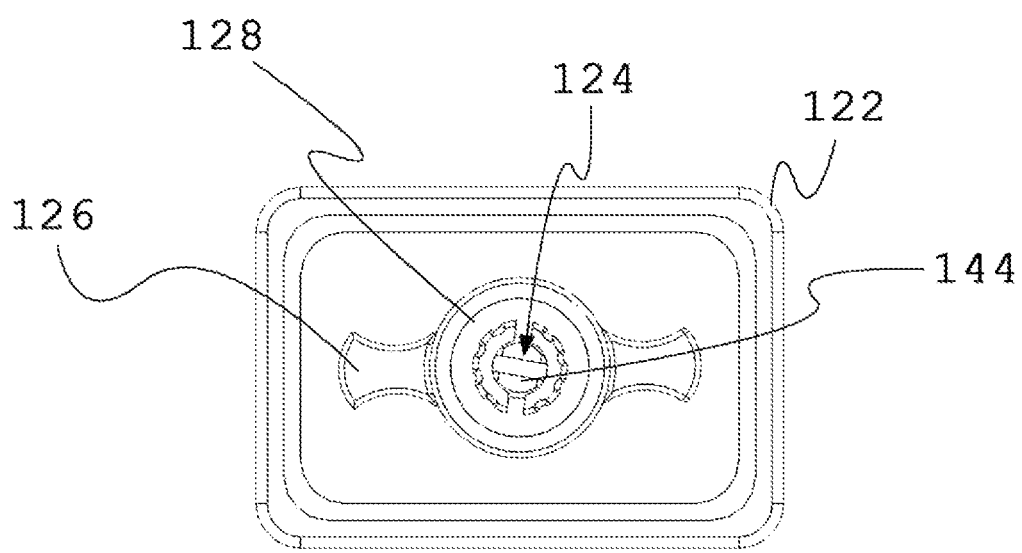
FIG. 24 is a top plan view of the swivel device depicted in FIG. 19.

Referring now to FIG. 18-34, a swivel device (120) configured for being associated with one end of the support structure (100) is presented. FIG. 19 and FIG. 20 present a front elevational view and a back elevational view (respectively) of the assembled swivel device (120) with swivel element (124) extending perpendicularly from swivel base (122). Similarly, FIG. 21 and FIG. 22 present a right side elevational view and left side elevational view (respectively). FIG. 23 presents an elevated perspective view of a swivel device (120) while FIG. 24 presents a top plan view of the swivel device (120).

For one embodiment, the swivel base (122) defines a support surface, and an opposing interface-surface wherein the outer perimeter of said swivel base defines a geometric figure (such as a square, rectangle, circle, etc.) suitably sized to provide a support function. A swivel element receiver (130, FIG. 25) that may be either integral to an interface-surface or mechanically associated with an interface-surface defines a base-to-swivel interface (132, FIG. 26). For one embodiment, such a base-to-swivel interface is a ball socket. The swivel element (124) defines an elongated body section defining a swivel-to-base interface (140) at one end and at least one swivel element latch (144) at the opposing end (146). For the current embodiment, the swivel-to-base interface (140) defines a sphere suitably sized to form a snap-fit with the ball socket defined by said base-to-swivel interface. The support structure attachment mechanism (128) may be configured for receiving said at least one swivel element latch (144) and further configured for being associated with a support structure (100).

Figure 25:
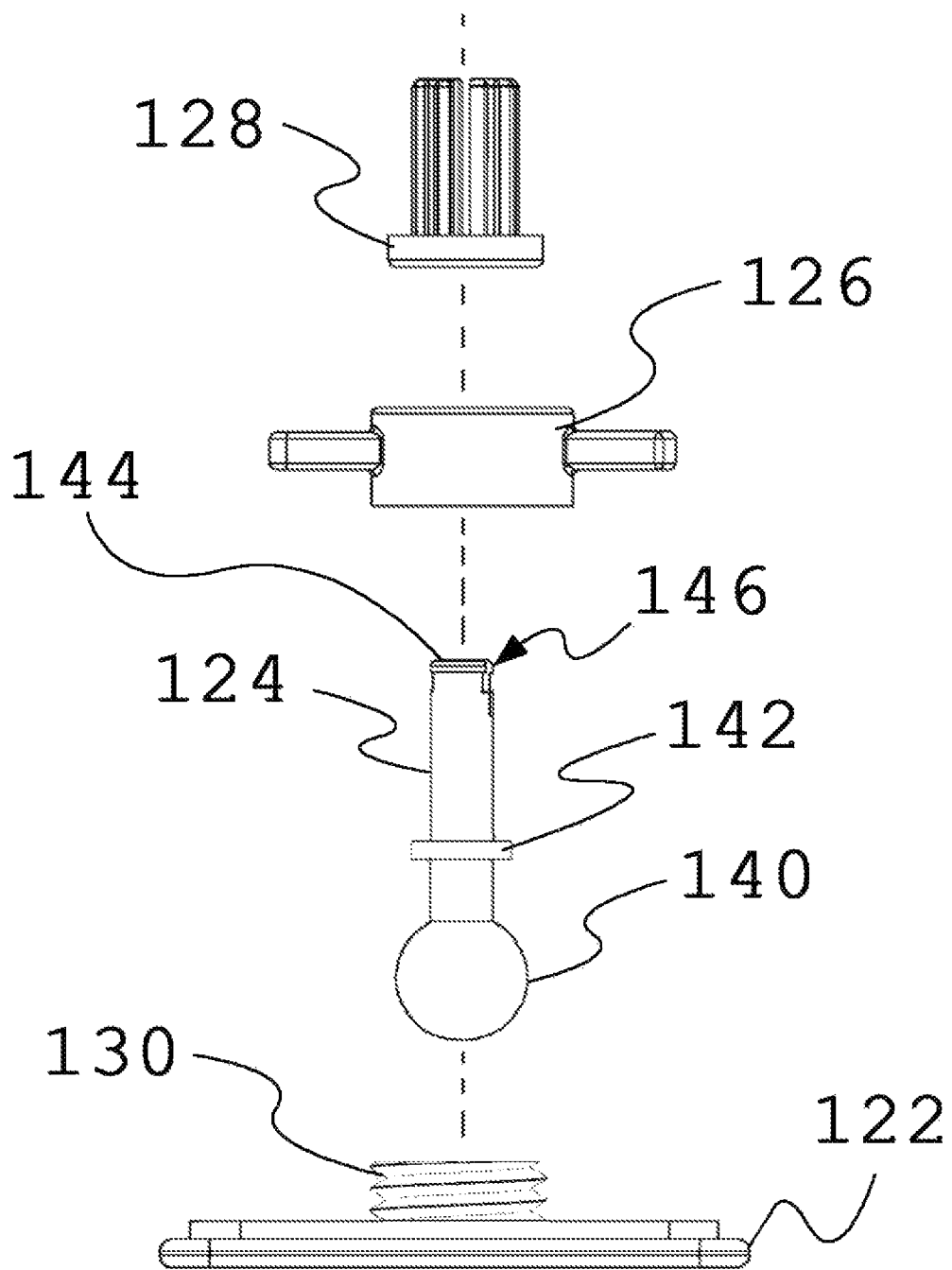
FIG. 25 is a front elevational exploded view of the swivel device depicted in FIG. 19.

For the currently preferred embodiment and as best seen in FIG. 25, the swivel device (120) comprises a swivel base (122) configured to receive a swivel-to-base-interface (140) defined at one end of the swivel element (124). The swivel-to-base-interface (140) may be configured to allow the swivel element (124) to be secured in one of a plurality of positions relative to the swivel base (122) using a swivel nut (126). The swivel element (124) is further configured with a swivel-to-ring-interface (142) and swivel element latches (144) configured for being mechanically associated with a support structure attachment mechanism (128). The support structure attachment mechanism (128) is further configured for being mechanically associated with a support structure such as a pole.

Figure 26:
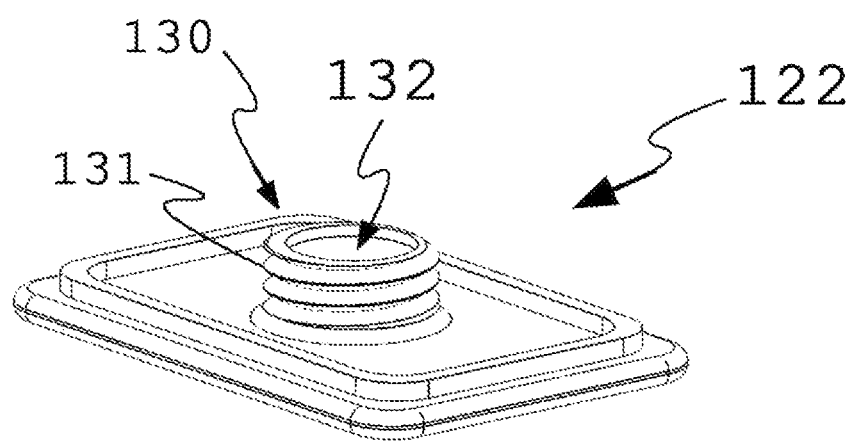
FIG. 26 is an elevated perspective view of one exemplary embodiment of a swivel base.
Figure 27:
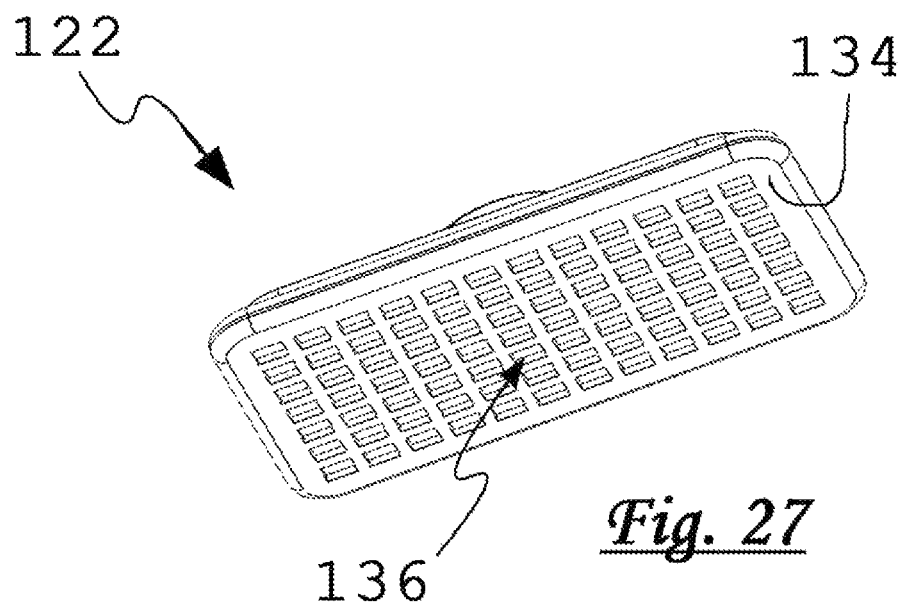
FIG. 27 is a lower perspective view of one exemplary embodiment of a swivel base.
Figure 28:
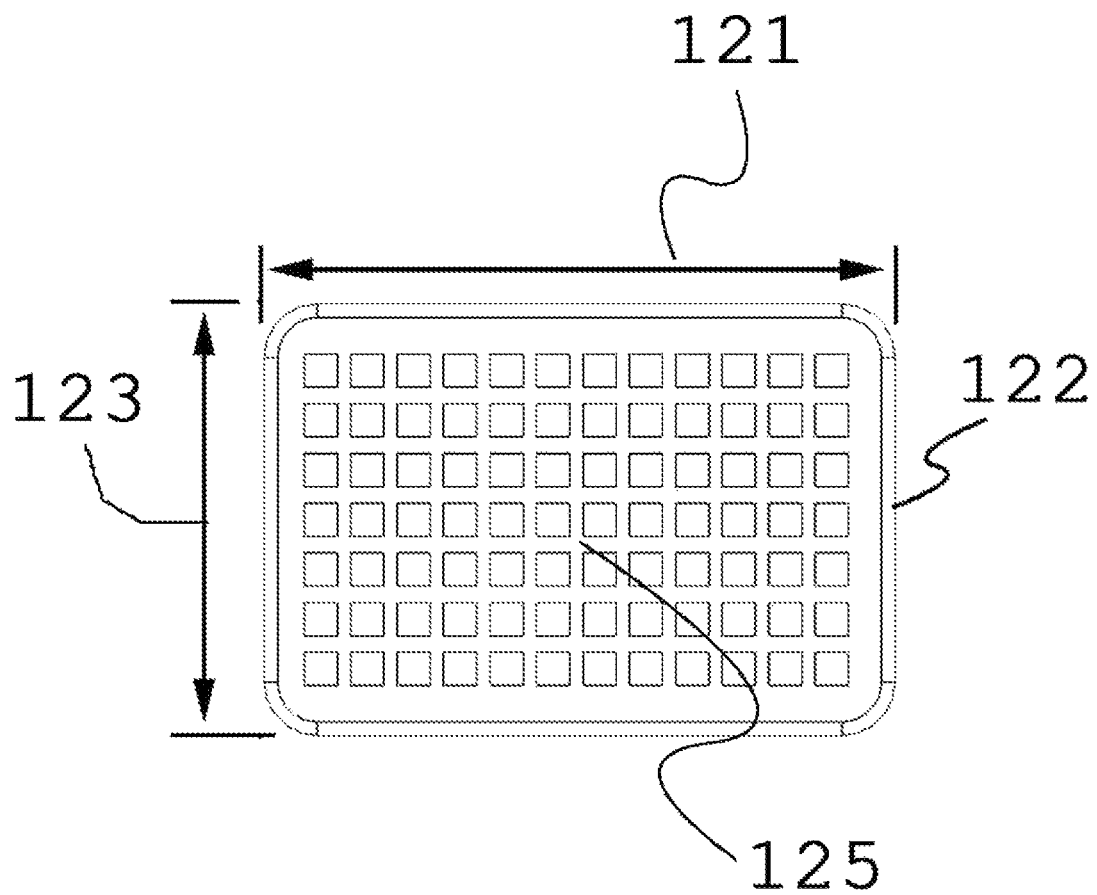
FIG. 28 is a bottom plan view of one exemplary embodiment of a swivel base.

Referring now to FIG. 26, FIG. 27 and FIG. 28, one exemplary embodiment of a swivel base (122) is presented. The swivel base (122) may define a surface shape for providing a stable association between the support structure (100) and a support surface. For the currently embodiment, the outer perimeter of the swivel base (122) defines a rectangular structure having a base length (121) and a base width (123). Any suitable height may be used, but for the current embodiment, the height is much smaller than the width or the length creating a generally plate-shaped structure. One surface of the swivel base (122) may further defines a swivel element receiver (130) configured for receiving a swivel-to-base-interface (140). As best seen in FIG. 25, for one embodiment, swivel-to-base-interface (140) defines a spherical structure extending from one end of a rod-type structure, and the swivel element receiver (130) defines a base-to-swivel-interface (132) configured for releasably and movably receiving the swivel-to-base-interface (140).

The swivel element receiver (130) may further define a latching interface (131) configured for being mechanically associated with an optional swivel latching device such as a swivel nut (126). As depicted in FIG. 26, one embodiment of a latching interface (131) includes threads. The swivel-to-base-interface (140) may be mechanically associated with the swivel element receiver (130) by inserting the swivel-to-base-interface (140) into the base-to-swivel-interface (132) and then (optionally) securing the association in place by a swivel nut (126). While the swivel element (124) is shown extending perpendicularly away from the swivel base (122) in FIG. 23, one of ordinary skill in the art will appreciate that a swivel nut (126) may be loosened and the swivel element (124) moved so that the swivel element (124) does not extend perpendicularly from swivel base (122) and secured at such position using swivel a nut (126). Such a feature may be used to provide a leveling function.

The swivel base (122) may further define a support surface interface (134) configured for being mechanically associated with a support surface (such as the floor of a boat). For the current embodiment, the support surface interface (134) provides enhanced gripping features so that the swivel base (122) does not easily slide across a support surface. For the current embodiment, support surface interface (134) further defines gripping elements (136) comprising a plurality of rectangular recesses/cavities configured to receive sections of a support surface, such as carpet, to dampen slipping of the swivel base (122) along a support surface. Alternatively, the gripping elements (136) may define a plurality of raised surfaces collectively defining a treaded surface structure. Any suitable gripping technology may be used.

Referring now to FIG. 29 and FIG. 30, one embodiment of a swivel element (124) is presented. For such an embodiment, the swivel element (124) has a rod section (141) (elongated body) with a swivel-to-base-interface (140) defined at one end and swivel element latches (144) defined at the other end. Embodiments of a swivel-to-base-interface (140) include a spherical structure defining the general shape of a ball suitably sized to "snap" into the base-to-swivel-interface (132) which defines the general shape of a ball socket. Such association may be configured to define a "snap-fit" where the diameter of the spherical structure is slightly less than the ball socket. Such a configuration allows the ball to move around inside the ball socket until secured in position by a device such as a swivel nut (126). Thus, when no swivel nut (126) is being used, or the swivel nut (126) is loose, such a snap-fit allows the swivel element (124) to move relative to the swivel base (122) without the two components separating. Such a snap-fit may be released by exerting a pulling force of sufficient strength to at least one of the swivel base (122) and the swivel element (124) so that the base-to-swivel-interface (132) separates from the swivel-to-base-interface (140).

The swivel-element (124) may further defines a swivel-to-ring-interface (142) defined along rod section (141) between the swivel-to-base-interface (140) and the swivel element latches (144). The swivel-to-ring-interface (142) may be configured for mechanically associating with a ring-to-swivel-interface (154) defined by the support structure attachment mechanism (128). For the current embodiment, the swivel-to-ring-interface (142) is an angular ring suitably sized to be inserted into a void (156) defined by ring section (152) so that a surface of swivel-to-ring-interface (142) presses against a lip defined by the ring-to-swivel-interface (154).

The length of the rod section (141) between the swivel-to-ring-interface (142) and the swivel element latches (144) is selected so that such sub-section of rod section (141) extends through the void (156) defined by the body section (150) so that the swivel element latches (144) mechanically associates with the body latch interface (157) defined by the support structure attachment mechanism (128). As can be seen in FIG. 29 and FIG. 30, the end (146) of rod section (141) distal to the swivel-to-base-interface (140) is bifurcated, thereby defining a rod gap (143) configured to allow a pinching force to move the opposing sides of the swivel element latches (144) closer together. By making the distance (145) from the end points of opposing swivel element latches (144) slightly longer than the inner diameter (151) of the void (156), the swivel element latches (144) can be pinched together and the rod section (141) inserted into the void (156) until the swivel element latches (144) extend through the support structure attachment mechanism (128) allowing the swivel element latches (144) to move apart and mechanically associated with the body latch interface (157) thereby securing the swivel element (124) to the support structure attachment mechanism (128).

Figure 33:
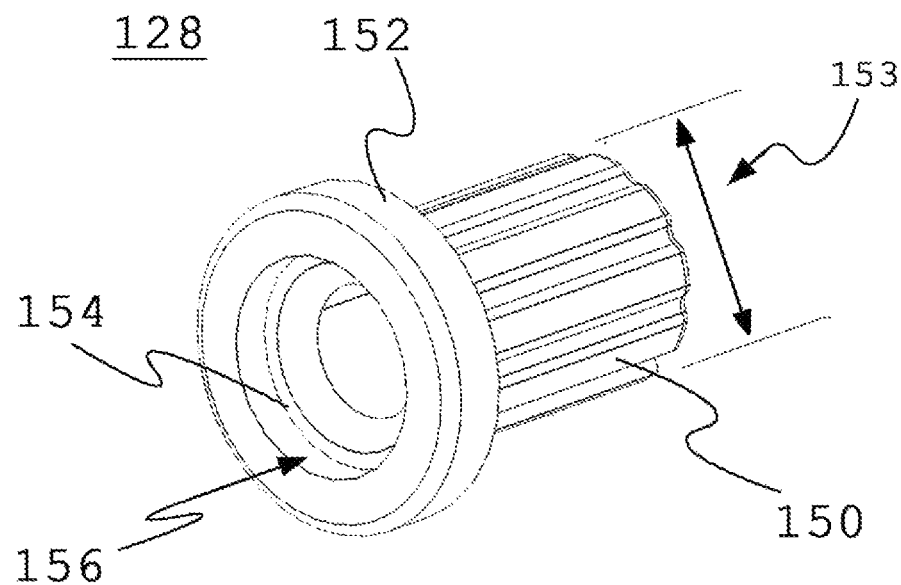
FIG. 33 is a side perspective view of one exemplary embodiment of a support structure attachment mechanism.
Figure 34:
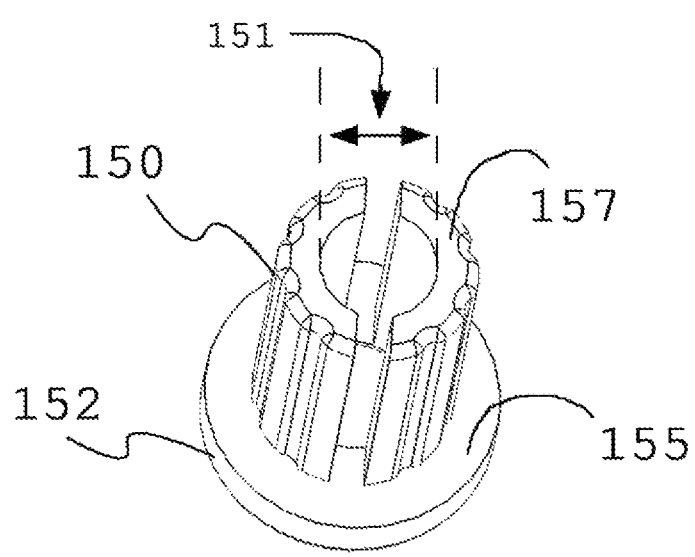
FIG. 34 is a side perspective view of one exemplary embodiment of a support structure attachment mechanism.

Referring now to FIG. 33 and FIG. 34, one exemplary embodiment of a support structure attachment mechanism (128) is presented. For the current embodiment, the support structure is a round hollow pole. Thus, the support structure attachment mechanism (128) defines a hollow cylindrical insert having a body section (150) defining an outer diameter (153) and further defining an inner void (156) having an inner diameter (151). The outer surface of the body section (150) comprises a plurality of alternating valley and ridges running along the length of the body section (150) to define a corrugated surface. One end of the body section (150) further defines a ring section (152). The ring-outer-diameter of the ring section (152) is longer than the outer diameter (153) defined by the attachment mechanism (128) to define a support structure interface (155) configured for associating with the end of a support structure. Further, the length of outer diameter (153) is slightly less than the length of a hollow support structure so that body section (150) may be inserted into the support structure until support structure interface (155) comes in contact with a surface of the support structure thereby providing a stop function (i.e., such a configuration stops the support structure attachment mechanism (128) from completely entering the hollow support structure).

Similarly, the ring section (152) further defines a ring-to-swivel-element-interface (154) configured for being associated with the swivel-to-ring-interface (142) defined by the swivel element (124). The inner diameter of the ring section (152) is slightly larger than the inner diameter (151) of the body section (150). Thus, when the rod section (141) is inserted into the void (156), the rod section (141) extends through body section (150) until swivel element latches (144) associated with body latch interface (157) and swivel-to-ring-interface (142) associates with ring-to-swivel-interface (154).

Figure 31:
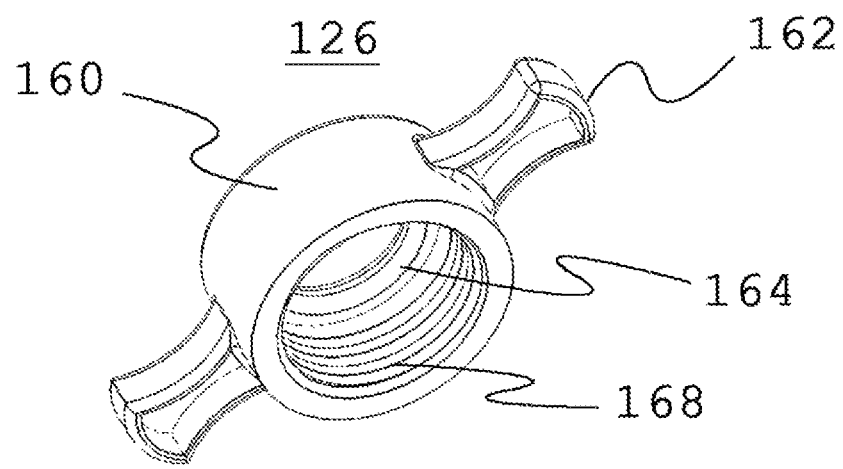
FIG. 31 is a lower perspective view of one exemplary embodiment of a swivel nut.
Figure 32:
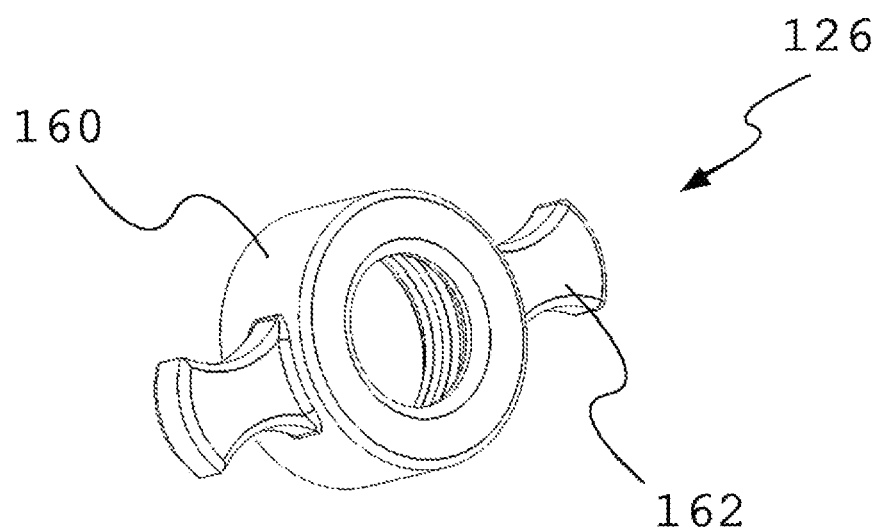
FIG. 32 is a top perspective view of one exemplary embodiment of a swivel nut.

Referring now to FIG. 31 and FIG. 32, one embodiment of a swivel nut (126) is presented. The swivel nut (126) may define a hollow nut body (160) and opposing nut wings (162) extending away from nut body (160). The inner surface of the nut body (160) defines a nut latching element (168). For the current embodiment, the nut latching element (168) includes female threads configured for receiving the male threads defined by a latching interface (131). Nut body (160) further defines a nut-to-swivel-interface (164) configured for associating with a surface of the swivel element (124). As will be appreciated by one of ordinary skill in the art, when the swivel nut (126) is fully tightened, movement between the swivel element (124) and the swivel base (122) becomes more difficult.

Swivel/Support/Ventilator Apparatus

Figure 35:
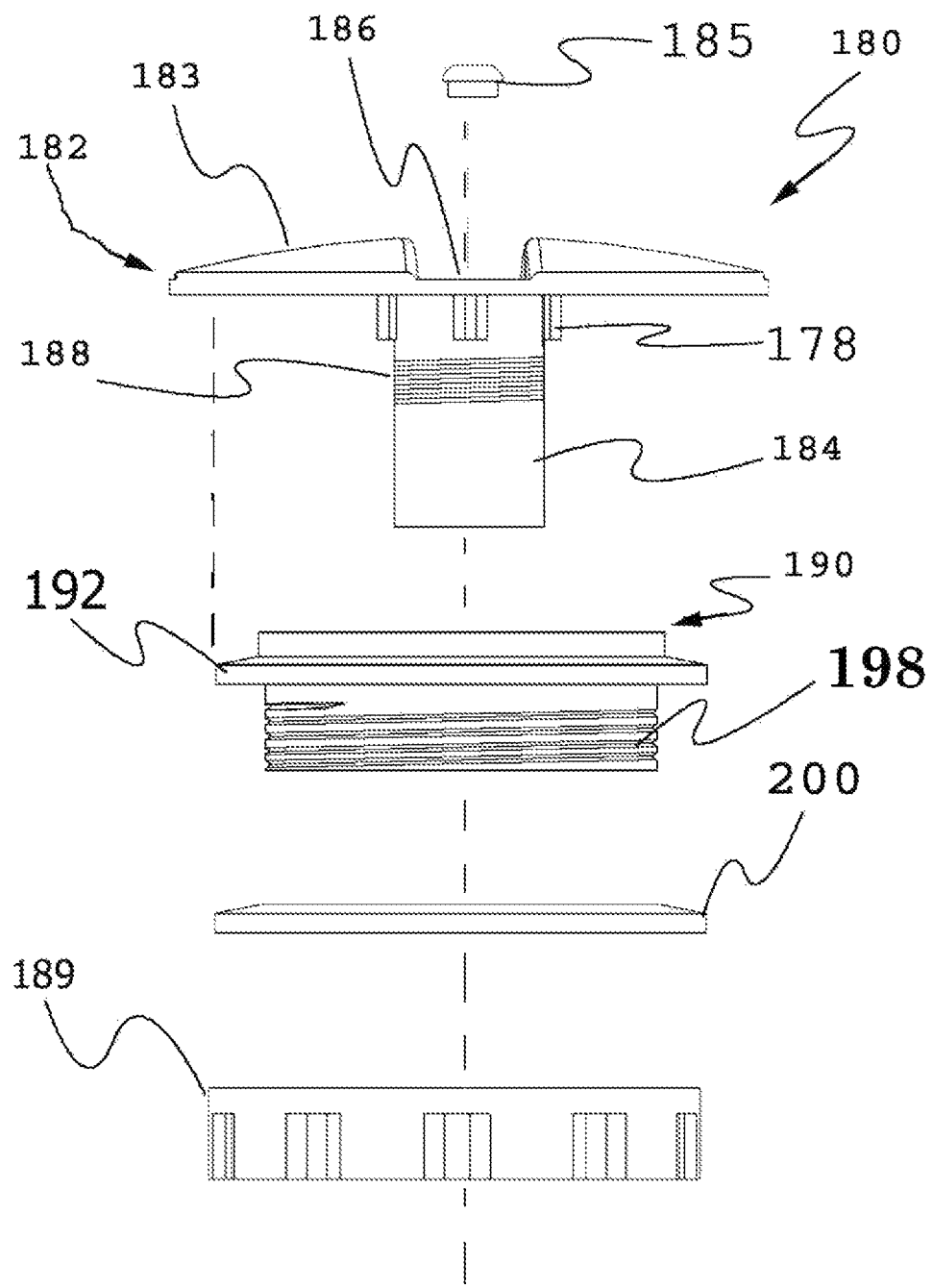
FIG. 35 is a side elevational exploded view of one exemplary embodiment of a support device comprising vent holes and defining a dome accessory interface.

Referring now to FIG. 35 through FIG. 53, exemplary embodiments of a swivel ventilator support device (180) is presented. As depicted in FIG. 35 and FIG. 38c, one embodiment of the support device (180) comprises a dome (182) comprising a dome portion (183) and a depending shaft portion (184) wherein the axial center (186) of the dome portion defines the upper most portion (for a non-grooved dome as depicted in FIG. 38c), and wherein the outer surface curves in a downward direction extending away from the axial center (186) a predefined distance thereby defining a dome-outer-perimeter that is one of a generally circular perimeter or a polygonal perimeter (such as a hexagon, octagon, etc.). The depending shaft portion (184) extends downwardly from the axial center (186) and further defines a first dome-attachment-interface (188). The support device (180) may further comprise a first-cover-interface (190), and a second-cover-interface (200) configured for supplying a clamping force (see FIG. 38*c*) to a cover (11) when the fastener (189) is tightened. Embodiments where the the depending shaft portion (184) and the first dome-attachment-interface are integrated into a signal component fall within the scope and spirit of the invention.

Figure 36:
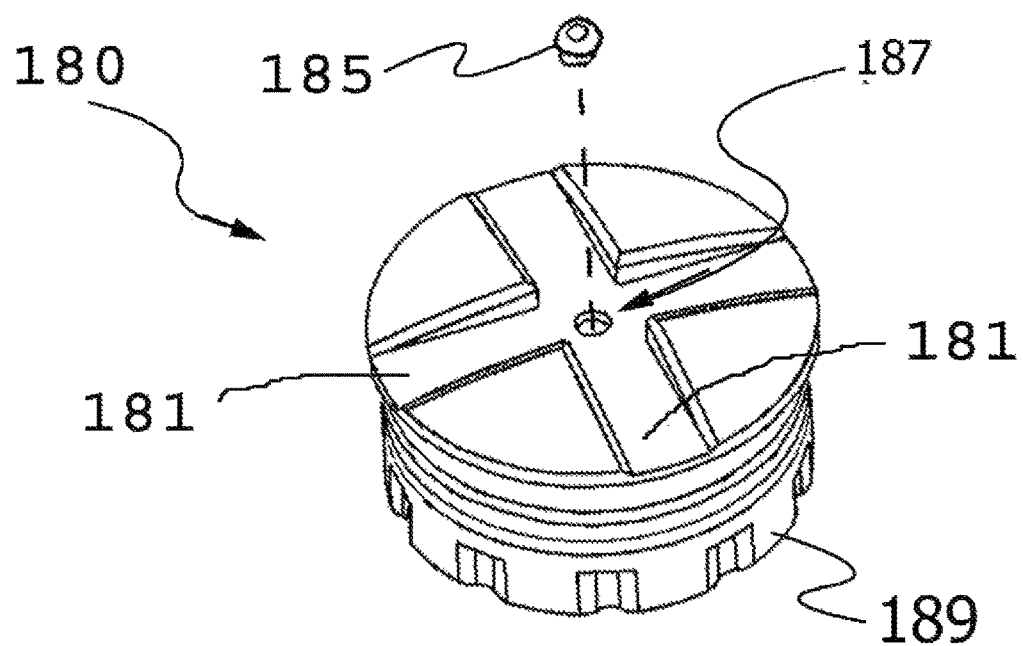
FIG. 36 is an elevated perspective view of the support device depicted in FIG. 35.
Figure 37:
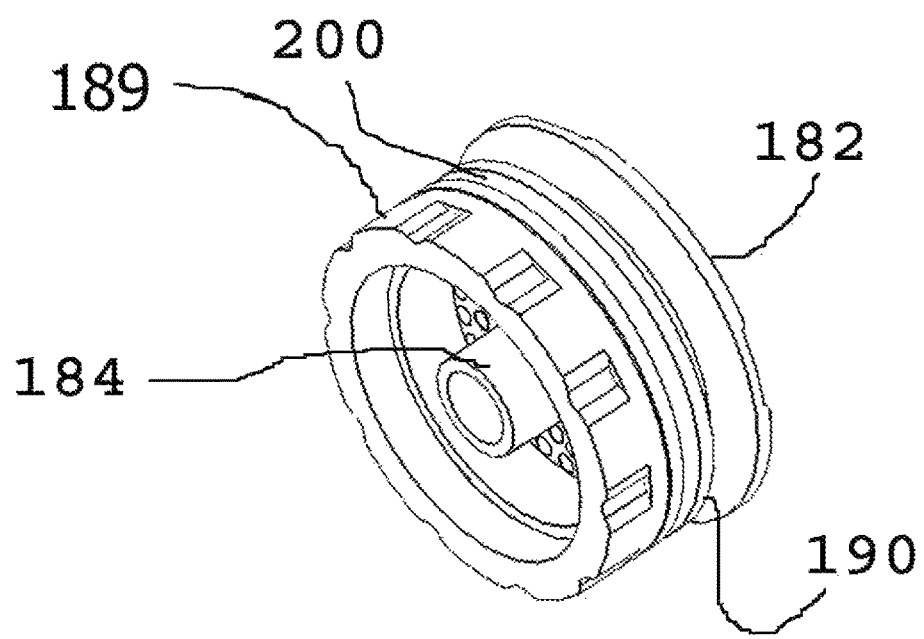
FIG. 37 is a bottom perspective view of the support device depicted in FIG. 35.

FIG. 36 and FIG. 37 present a top perspective view, and a bottom perspective view respectively of the support device (180) wherein dome portion (183) defines dome-groves (181) that intersect at the axial center (186). Alternative embodiments included domes with no dome groves, one dome groove, and two intersecting dome groves as depicted in FIG. 36, or any number of grooves.

Figure 40:
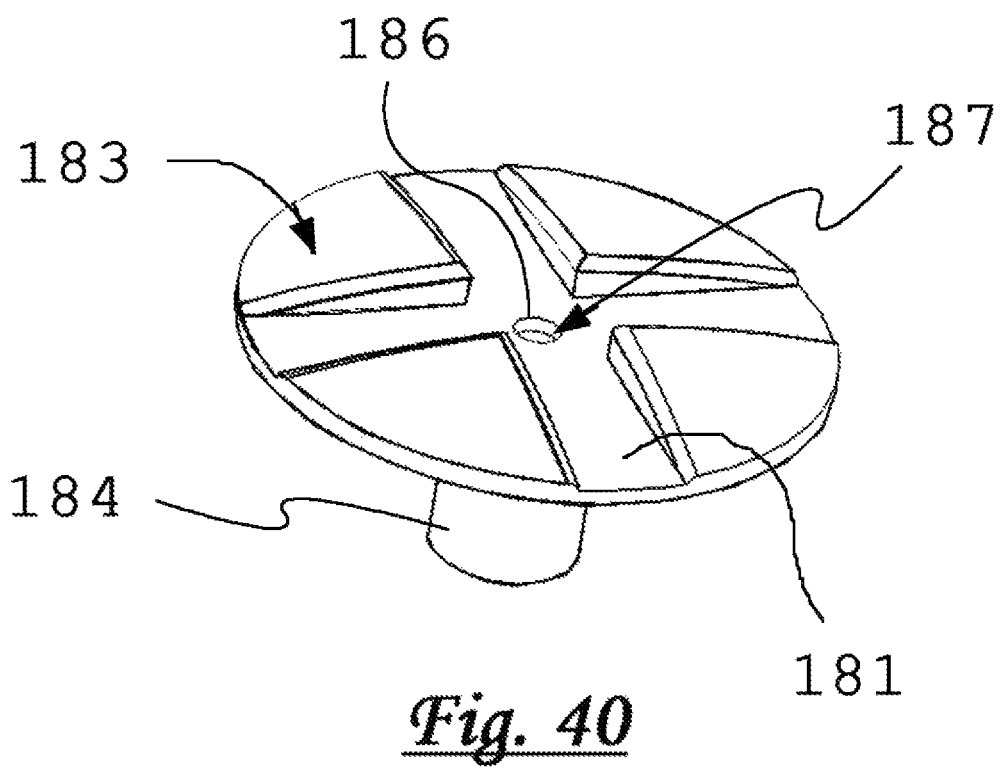
FIG. 40 is an elevated perspective of a support device dome comprising dome-grooves and defining an exemplary suspension interface at its axial center.
Figure 41:
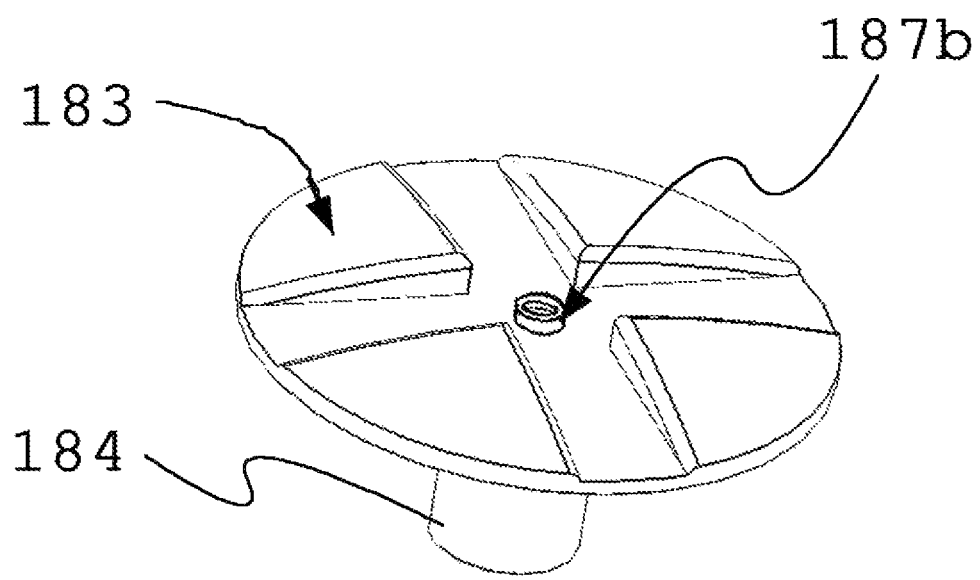
FIG. 41 is an elevated perspective of a support device dome in FIG. 40 where the suspension interface extends beyond the surface of the dome.

For one exemplary embodiment, the dome (182) further defines a suspension-interface (187) at the axial center (186). For the current embodiment, as depicted in FIG. 40 and FIG. 41, the suspension-interface (187) defines a hole which may extend beyond the surface of the dome-portion (183, FIG. 41). An optional dome-accessory (185, FIG. 36) may be included for embodiments where a suspension interface (187, 187*b*) is defined at the axial center (185). Examples of dome-accessories (185), wherein the suspension interface (187) is a hole, include a plug, cleat, rope fasteners, and lighted plug. A lighted plug, for example, may include a plug configured for being inserted into suspension interface (187) wherein in said plug comprise a battery, a low power consumption light generator such as an LED that is further connected to an accelerometer to provide an independent brake light function when a vehicle is being towed. Restated, the light senses acceleration and self-activates.

As best seen in FIG. 40 through FIG. 43, the dome (182) is considered in more detail. The dome (182) comprises a dome portion (183), and a depending shaft portion (184) wherein the axial center (186) of said dome portion is the uppermost portion (for non-grooved dome as depicted in FIG. 38*c*). The outer surface of the dome portion (183) curves in a downward direction extending away from the axial center (186) a predefined distance, thereby defining a dome-outer-perimeter that is one of a generally circular perimeter or a polygonal perimeter (such as a hexagon, octagon, etc.). The depending shaft portion (184) extends downwardly from said axial center (186) and further defines a first dome-attachment-interface (188). Any suitable attachment interface may be used, including threads and resilient/flexible snaps/tabs. For the embodiment in FIG. 42, such an attachment interface defines threads. The depending shaft portion (184) may be solid or hollow or a mixture of both. For the currently preferred embodiment, the depending shaft portion (184) is hollow. Further, the suspension interface (187) is a hole at the axial center (186) so that an object (such as a rope) may be passed through the suspension interface (187) and through depending shaft portion (184). Restated, hole (187) extends through dome portion (183), and since the depending shaft portion (184) is hollow, a void extends through the dome portion (183) and the depending shaft portion (184). With such a configuration one may insert a tether, such as a rope, through the suspension interface (187) and through the hollow depending shaft portion (184), tie a knot at the end of such rope and pull the rope back through the shaft portion until the knot reaches hole (suspension interface) (187). Other suspension interfaces (187) configurations include dome-accessories (185) as described above.

For one embodiment, no suspension interface (187) is provided, and the hollow shaft portion (184) defines a blind opening so that a pole may be inserted into depending shaft portion (184) to supply a supporting force to support device (180). It should be further appreciated that for embodiments where the diameter of the hollow section of the depending shaft portion (184) is greater than the diameter of the hole defining suspension interface (187), a pole may be used to supply a support force where the outer diameter of such pole is greater than the diameter of hole (187).

Figure 38:
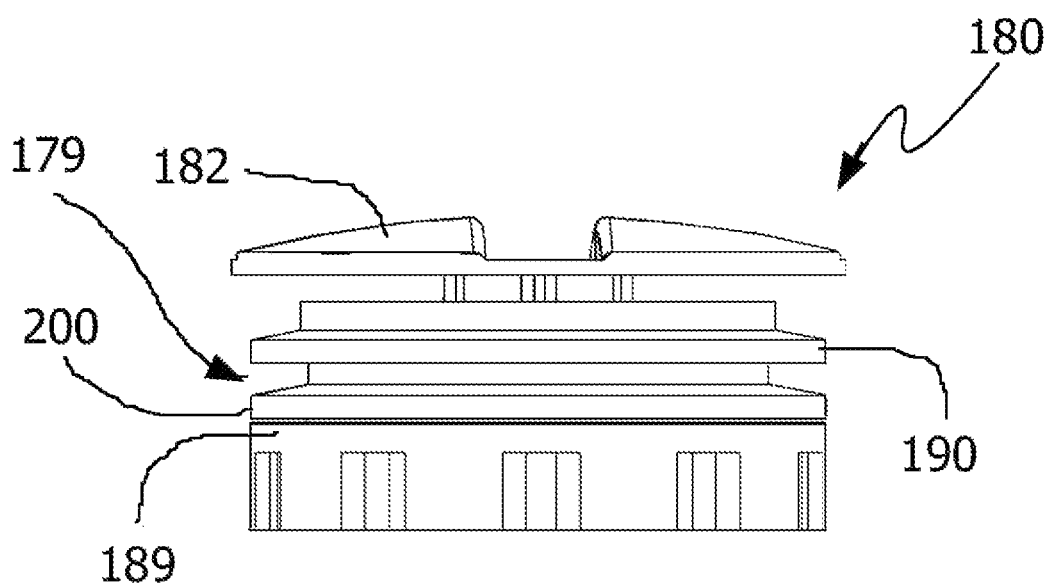
FIG. 38 is a side elevation view of the support device depicted in FIG. 35.
Figure 39:
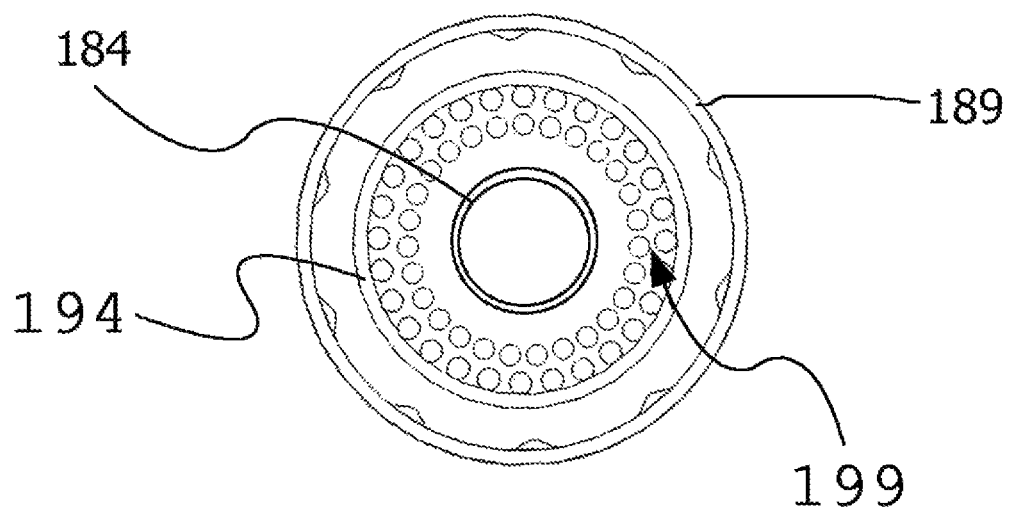
FIG. 39 is a bottom plan view of the support device depicted in FIG. 35.

For the currently preferred configuration, the length (177) of the depending shaft (184) may be selected so that the shaft-free-end (176) does not extend beyond fastener (189) when support device (180) is assembled as depicted in FIG. 38.

Figure 38B:
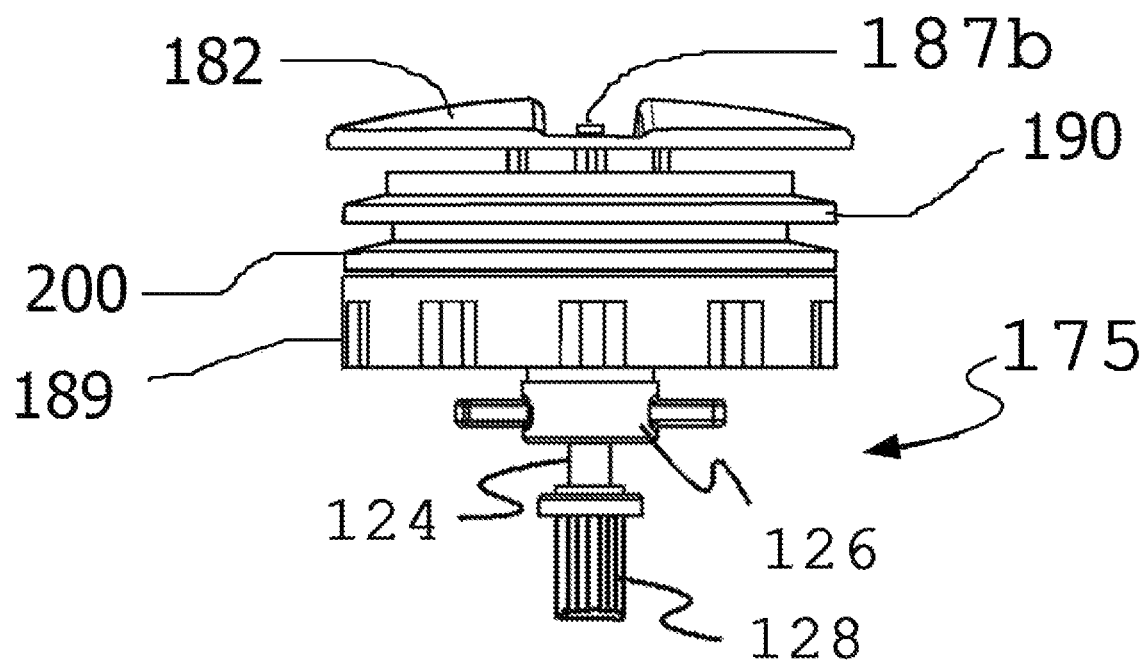
FIG. 38B is a side elevational view of the support device depicted in FIG. 35 further comprising a swivel interface.
Figure 38C:
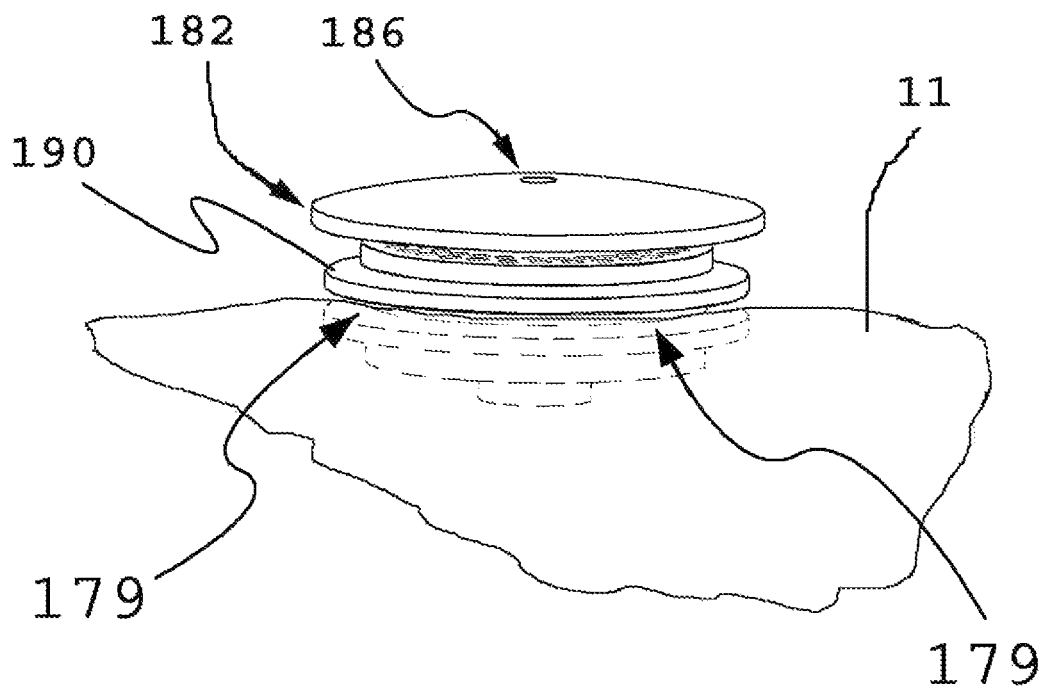
FIG. 38c is a side perspective view of the support device depicted in FIG. 35 except for the dome portion which does not comprise dove-grooves and where the drawing further shows how such a device might look when in use.

For one alternative embodiment, as depicted in FIG. 38B and FIG. 43, the free end of depending shaft portion (184) further defines a shaft-swivel-interface (175). For such configuration, the length (177*b*, FIG. 43) of depending shaft (184) may be selected so that the shaft-swivel-interface (175) extends at least partially beyond fastener (189) as depicted in FIG. 38B). One example of a shaft-swivel-interface (175) is a ball socket, as disclosed earlier, for the swivel-to-base-interface (140). Such a ball socket may be configured for receiving a swivel ball, thereby defining a swivel interface. Such ball socket may be either "sighted" (i.e. where (i) there is a hole in the middle of the ball socket, (ii) the depending shaft is hollow, and (iii) there is a hole at the axial center of the dome portion) or "blind" (one or more of the previously mentioned openings/holes are not provided).

As before, the swivel element (124) defines an elongated body section defining a swivel-to-shaft interface (140*b*) at one end and at least one swivel element latch (144*b*) at the opposing end. For such embodiment, the swivel-to-shaft interface (140*b*) defines a sphere suitably sized to form a snap-fit with the ball socket defined by the shaft-to-swivel interface (175). Such a snap-fit configuration allows the swivel element (124) to move relative to the depending shaft portion (184).

As best seen in FIG. 43, the free end (176) of the depending shaft (184) may further define a second dome attachment interface (188*b*). One embodiment of such an attachment interface includes threads. For such a configuration, the swivel element (124) may be secured in one of a plurality of positions relative to support device (180) using a fastener (such as a nut) configured for being associated with second dome attachment interface (188*b*, FIG. 38B). Stated differently, the depending shaft portion defines threads configured for being associating with a nut configured to secure a swivel ball in said ball socket to attenuate movement between the swivel ball and the ball socket when said nut is tightened.

As depicted in FIG. 38B, for the current embodiment, a support structure attachment mechanism (128) is used to mechanically associate swivel element (124) with a support structure such as a pole.

Figure 44:
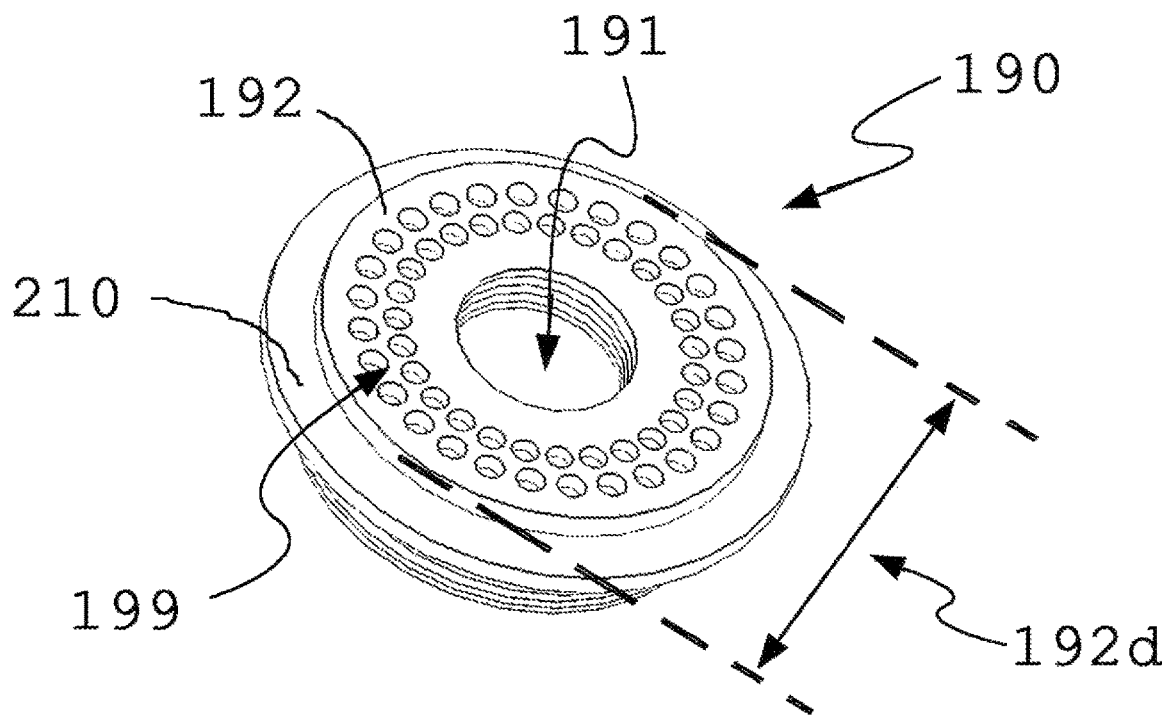
FIG. 44 is an elevated perspective view of one exemplary embodiment of a first cover interface.
Figure 45:
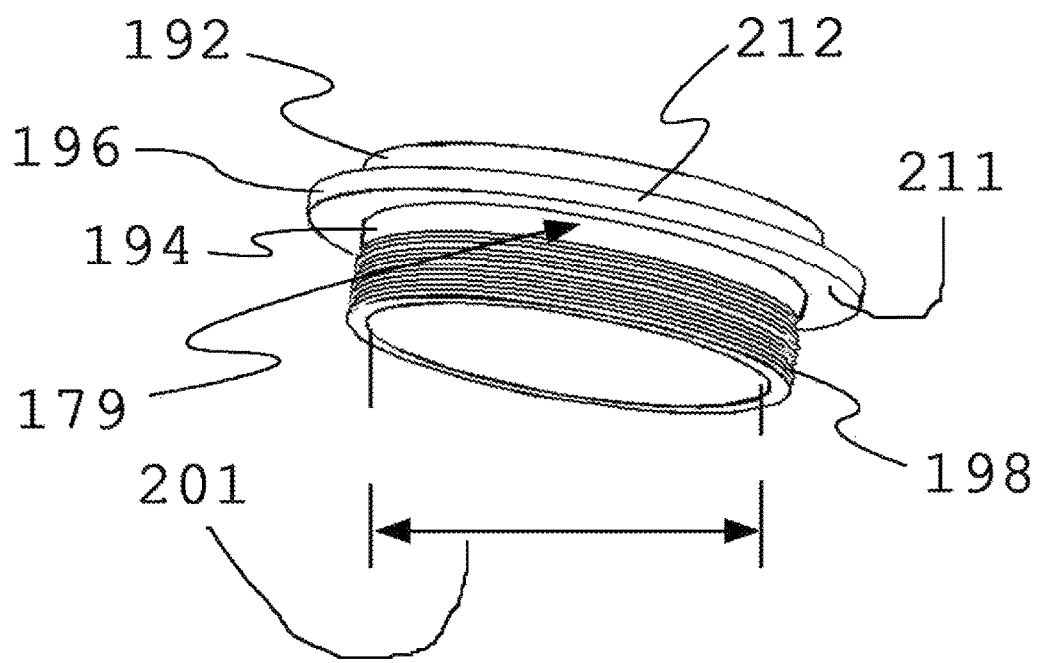
FIG. 45 is a bottom perspective view of one exemplary embodiment of a first cover interface.
Figure 45B:
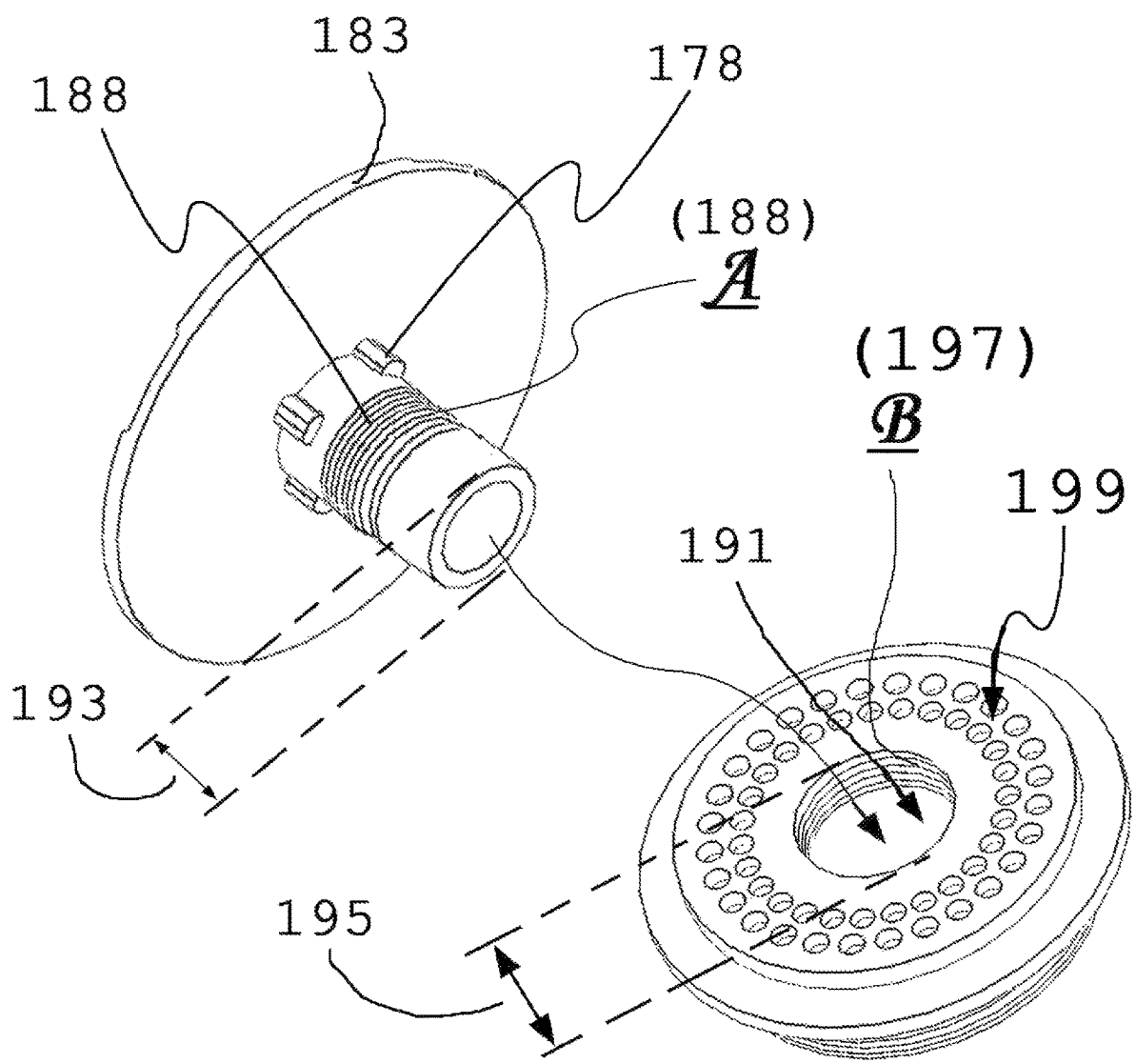
FIG. 45B is an exploded perspective view of a support device dome and first cover interface.
Figure 46:
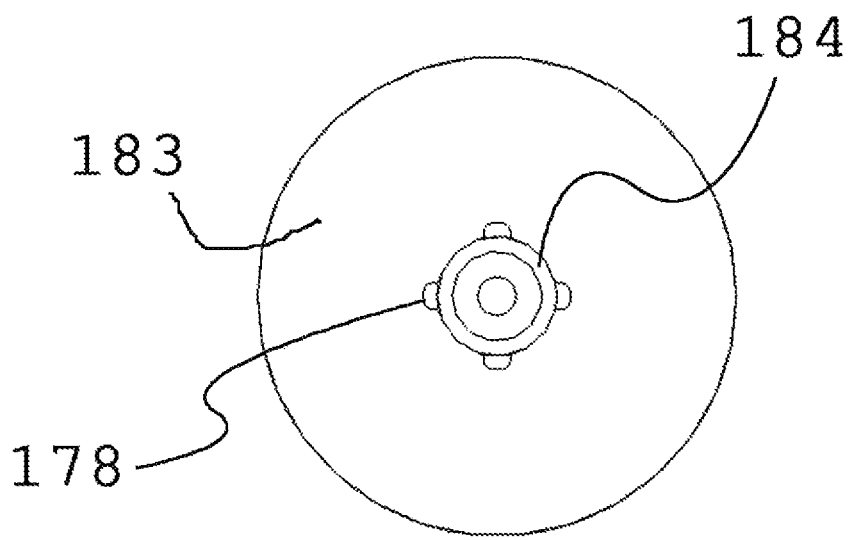
FIG. 46 is a bottom plan view of one exemplary embodiment a support device dome.
Figure 47:
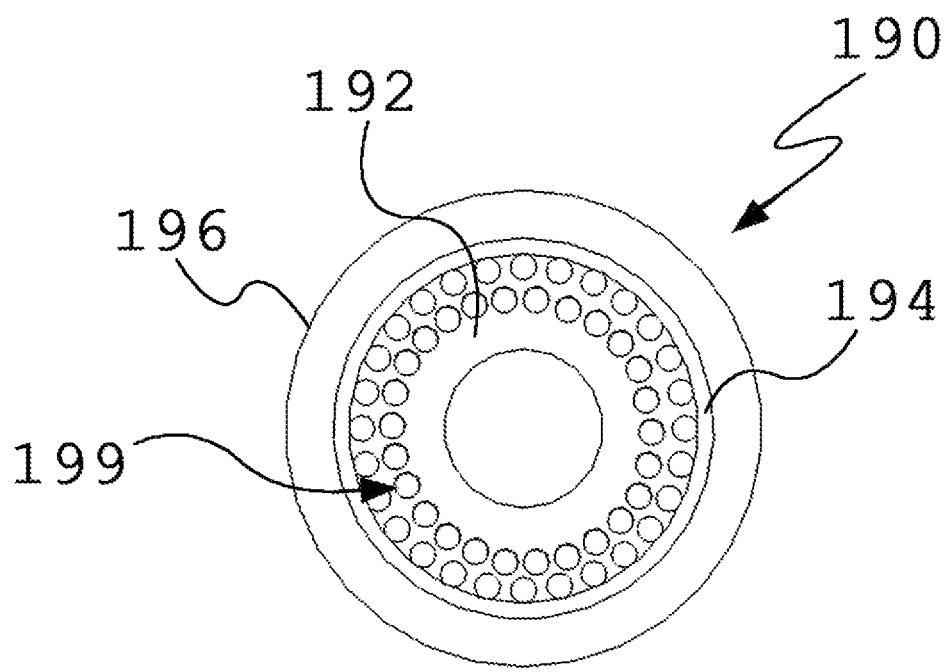
FIG. 47 is a bottom plan view of one exemplary embodiment of a first cover interface.
Figure 48:
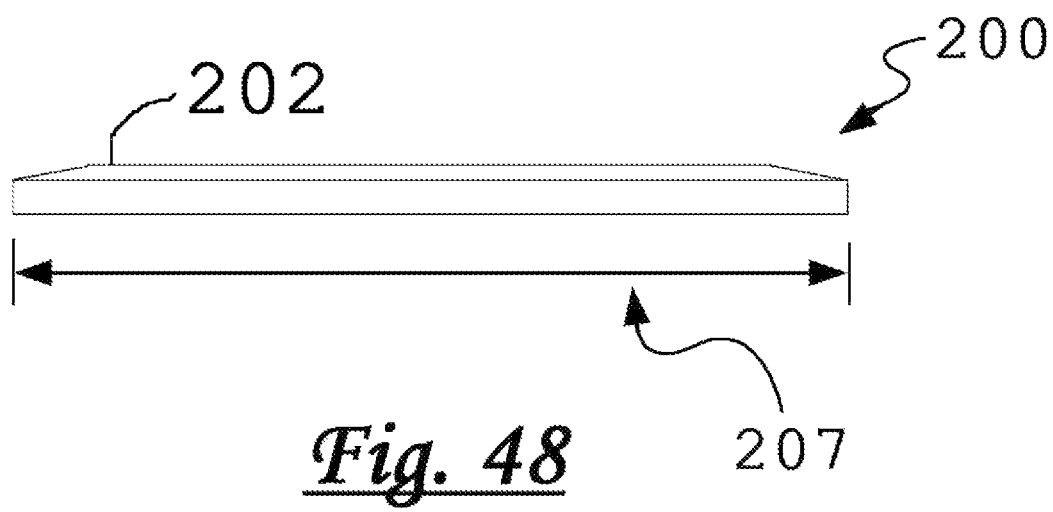
FIG. 48 is a side elevational view of one exemplary embodiment of a second cover interface.
Figure 49:
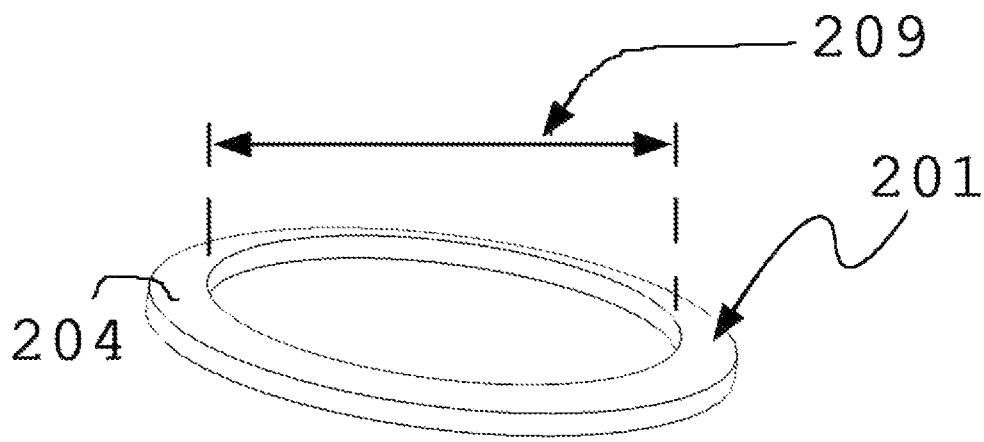
FIG. 49 is an elevated perspective view of one exemplary embodiment of a second cover interface.
Figure 50:
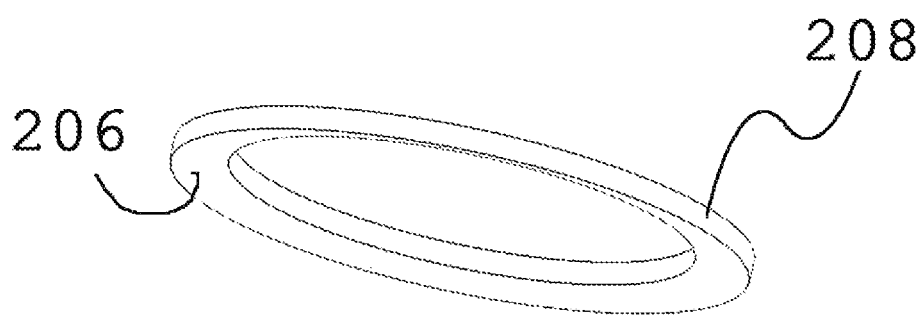
FIG. 50 is a bottom elevational view of one exemplary embodiment of a second cover interface.

As best seen in FIG. 44, FIG. 45, FIG. 45*b*, and FIG. 47, the first-cover-interface (190) is considered in more detail. The first-cover-interface (190) comprises a disc-portion (192), a lower-band-portion (194), and a first clamping-ring-portion (196) extending radially and outwardly therefrom. Such components may define one integral component or a plurality of mechanically associated components. The disc-portion (192) defines a disc-hole (191) in the approximate center thereof, wherein the outer diameter (192*d*, FIG. 44) of the disc-portion (192) is shorter/smaller than the dome-outer-perimeter so that the dome-portion (183) provides an umbrella function to the disc-portion (192). Additionally, as depicted in FIG. 45B, the diameter (195) of the disc-hole (191) may be larger than the diameter (193) of the depending shaft portion (184) so that the depending shaft portion (184) can be inserted through the disc-portion (192). For the current embodiment, at least part of the surface of the disc-portion defining the outer boundary of the disc-hole (191) further defines a disc-attachment-point (197) (i.e. threads "B," FIG. 45B). For the current embodiment, the disc-attachment-point (197) defines threads "B" configured for being mechanically associated with threads "A" (i.e., the first dome-attachment-interface (188)), defined by the depending shaft portion (184).

For embodiments where the support device (180) is further configured to provide a venting function, disc-portion (192) defines at least one vent (199) there through configured to transfer air from one side of disc-portion (192) to the other side. When the support device (180) is associated with a cover (11) as depicted in FIG. 38c, such a configuration provides an air transfer function from one side of the cover (11) to another side. For the embodiment depicted in the various drawings, the disc-portion (192) defines a plurality of equally sized round holes that extend through the first-disc portion (192). Any number and size and shape of such vent (199) holes may be used without departing from the scope and spirit of the present invention.

The first-cover-interface (190) may further comprise a lower-band-portion (194) that extends downwardly from the disc-portion (192, FIG. 45). The inner diameter (201) of the lower-band-portion (194) is greater than the diameter (195) of disc-hole (191). The outer diameter of said lower-band-portion (194) is less than the outer diameter of the first clamping-ring-portion (196). A surface of the lower-band-portion (194) defines a lower-band-attachment-point (198). For the current embodiment, lower-band-attachment-point (198) defines threads on the outer surface of the lower-band-portion (194).

As depicted in FIG. 44 and FIG. 45, the first clamping-ring-portion (196) comprises an upper surface (210) and a lower surface (211) connected by a peripheral edge (212). A Clamping zone (179) is defined along the lower surface (211) between the outer diameter of the clamping-ring (196) and the outer diameter of the lower-band-portion (194) wherein such clamping zone is configured for being associated with a cover (11) to be supported as depicted in FIG. 38c.

The support device (180) further comprises a second-cover-interface (200) comprising second-clamping-ring (202). The second-clamping-ring (202) comprises an upper surface (204) and a lower surface (206) connected by a peripheral edge (208). A second-clamping-region (201) is defined along the upper surface (204) between the outer-diameter (207) of the second-clamping-ring (202) and the inner-diameter (209) of the second-clamping-ring (202). Such a second-clamping-region is configured for being associated with a cover (11) to be supported as depicted in FIG. 38c.

For the current embodiment, the inner-diameter (209) of the second-clamping-ring (202) may be substantially equal to the inner-diameter of the clamping zone/region (179). The outer-diameter of the second-clamping-ring (202) is substantially equal to the outer diameter of the first-clamping-ring-portion (196). One of ordinary skill in the art will appreciate that such a configuration allows the lower-band-portion (194) to be inserted into the second-clamping-ring (202) so that the second-clamping-ring (202) may be moved along lower-band-portion (194) until the second-clamping-region (201) (upper surface (204)) becomes adjacent to clamping-region (179) defined by the ring-lower-surface (210) thereby creating a pinch point that defines a clamping zone.

As depicted in the various drawings, the clamping surfaces of the first-clamping-ring-portion (196) and the second-clamping-ring (202) are contoured or beveled to improve fitment between the support device (180) and cover (11). In fact, for the second-clamping-ring (202) embodiment depicted in FIG. 48, FIG. 49, and FIG. 50, the second-clamping-ring (202) defines the general shape of a beveled washer.

Figure 51:
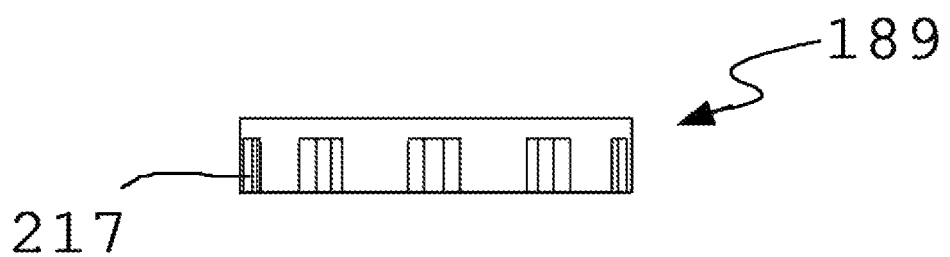
FIG. 51 is a side elevational view of one exemplary embodiment of a fastener.
Figure 52:
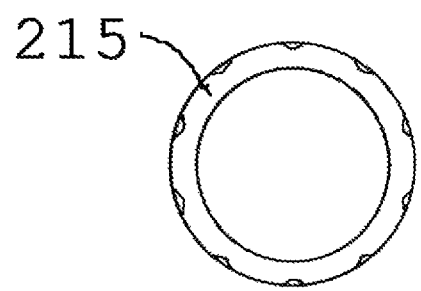
FIG. 52 is a top plan view of one exemplary embodiment of a fastener.
Figure 53:
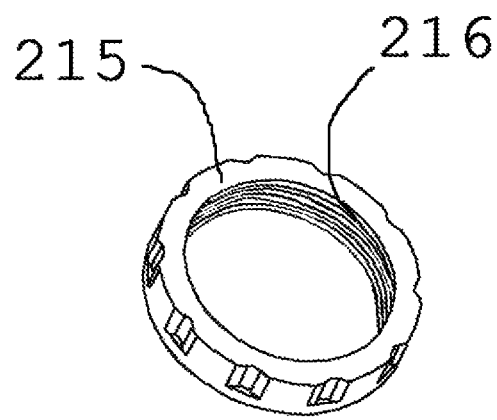
FIG. 53 is an elevated perspective view of one exemplary embodiment of a fastener.

Referring now to FIG. 51, FIG. 52, and FIG. 53, the support device (180) further comprises a fastener (189). The fastener (189) may be configured for adjustably associating with lower-band-attachment-point (198) so that the fastener (189) moves along the surface of the lower-band-portion (194). As the fastener (189) moves along the surface of the lower-band-portion (194), the fastener surface (215) presses against the lower-surface (206) of the second-clamping-ring (202) thereby causing the second-clamping-ring (202) to move along the lower-band-portion (194). When the fastener (189) is being tightened or engaged, the second clamping ring (202) moves toward the first-clamping-ring-portion (196), thereby causing the first clamping-region and the second clamping-region to define a clamping force there between (clamping-zone (179)). When a cover is in the claiming-zone (179), the support device (180) becomes mechanically associated with such cover (11).

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A swivel assembly configured for associating a swivel base with a support structure, said swivel assembly comprising:
   a support structure attachment component comprising:
     (a) a hollow body defining a hollow body length an inner body diameter, and an outer body diameter;
     (b) a ring receiver defined at a first end of said hollow body and defining an inner ring receiver diameter longer than said inner body diameter and shorter than said outer body diameter and an outer ring receiver diameter longer than said outer body diameter thereby defining a support structure interface surface; and
     (c) a rod latch receiver defined at a second end opposed from said first end of said hollow body;
   a swivel component comprising:
     (a) a rod section defining a rod section outer diameter that is shorter than said hollow body inner diameter;
     (b) a swivel interface defined at a first rod end of said rod section and configured to movably engage a swivel base component;
     (c) a rod latch defined at a second rod end opposing said first rod end of said rod section;
     (d) a ring defining a predefined ring distance away from said first, rod end and between said first rod end and said second rod end wherein said ring extends away from said rod section to define an outer ring diameter that is shorter than said inner ring receiver diameter; and wherein the length of said rod section and said hollow body length are selected so that said rod section can be inserted into said hollow body anti wherein said predefined ring distance is selected so that said rod latch engages said rod latch receiver and said ring is at least partially received by said ring receiver.

2. A swivel assembly as in claim 1, wherein an outer surface of said hollow body comprises a plurality of alternating valleys and ridges running along the length of said hollow body to define a corrugated surface and wherein said hollow body is configured for being inserted into the support structure.

3. A swivel assembly in claim 2, wherein said ring extends perpendicularly from and annularly around the circumference of said rod section.

4. A swivel assembly as in claim 3, wherein said swivel interface defines a swivel ball.

5. A swivel assembly as in claim 1 wherein said swivel interface is generally spherically shaped defining a ball with said rod section extending therefrom.

6. A swivel assembly as in claim 5, wherein said rod latch defines at least one tap that extends away from said second rod end.

7. A swivel assembly as in claim 6, further comprising a swivel nut defining threads configured for mechanically associating with threads defined by the swivel base component and wherein said nut is configured to secure said swivel interface to the swivel base component.

8. A swivel assembly as in claim 1, wherein said rod latch defines a plurality of tabs extending away from said second rod end and wherein said second rod end is bifurcated defining a rod end slot defining a gap between opposing rod end sections with each rod end section comprising at least one of said plurality of tabs and wherein the length of said rod end slot is longer than that the gap distance and shorter than said predefined ring distance.

9. A swivel assembly as in claim 8, wherein said ring does not fully insert into said ringer receiver.

* * * * *